(12) United States Patent
Boyer et al.

(10) Patent No.: US 12,695,784 B2
(45) Date of Patent: Jul. 28, 2026

(54) SYNTHETIC CYBERATTACK TOOL THAT USES A GENERATIVE ARTIFICIAL INTELLIGENCE COMPONENT

(71) Applicant: Darktrace Holdings Limited, Cambridge (GB)

(72) Inventors: John Boyer, Cambridge (GB); Jake Lal, Cambridge (GB); Philip Sellars, Cambridge (GB); Timothy Bazalgette, Knebworth (GB); Dickon Humphrey, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 0 days.

(21) Appl. No.: 18/678,451

(22) Filed: May 30, 2024

(65) Prior Publication Data

US 2024/0406206 A1 Dec. 5, 2024

Related U.S. Application Data

(60) Provisional application No. 63/472,227, filed on Jun. 9, 2023, provisional application No. 63/470,571, filed on Jun. 2, 2023.

(51) Int. Cl.

| | |
|---|---|
| *H04L 9/40* | (2022.01) |
| *G06F 9/455* | (2018.01) |
| *G06F 21/55* | (2013.01) |
| *G06F 21/56* | (2013.01) |
| *G06F 21/62* | (2013.01) |

(Continued)

(52) U.S. Cl.
CPC ...... *H04L 63/1441* (2013.01); *G06F 9/45558* (2013.01); *G06F 21/554* (2013.01); *G06F 21/566* (2013.01); *G06F 21/6245* (2013.01); *G06N 3/045* (2023.01); *G06N 3/0895* (2023.01); *H04L 63/1433* (2013.01); *G06F 2009/45587* (2013.01); *G06F 2221/033* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 11,316,875 | B2 * | 4/2022 | Frey | H04L 63/14 |
| 11,587,177 | B2 * | 2/2023 | Sankar | G06Q 40/08 |

(Continued)

*Primary Examiner* — Raqiul A Choudhury
(74) *Attorney, Agent, or Firm* — Rutan and Tucker, LLP

(57) ABSTRACT

A synthetic cyberattack tool uses a generative AI component to assist in generating a synthetic cyberattack by a cyber threat to produce one or more cybersecurity incidents and/or events. The synthetic cyberattack tool uses the generative AI component also to provide an analysis and an explanation for a purpose of providing cyber security training to at least one of an end user of a network and a cyber security team member for the network in a mimic network. The synthetic cyberattack tool orchestrates the synthetic cyberattack and derives the synthetic cyberattack from real world cyberattacks and the wargaming cyberattack exercise from real world behaviors of the end user and/or the cyber security team member as well as the architecture and policies implemented in the real world network. A user interface component displays both results of testing in the wargaming cyberattack exercise along with an explainability on the synthetic cyberattack.

20 Claims, 8 Drawing Sheets

(51) Int. Cl.
    *G06N 3/045*         (2023.01)
    *G06N 3/0895*       (2023.01)

(56)            References Cited

U.S. PATENT DOCUMENTS

| | | | | |
|---|---|---|---|---|
| 12,041,082 | B2 * | 7/2024 | Lam | H04L 63/1416 |
| 2017/0359359 | A1 * | 12/2017 | Jaladi | G06F 8/65 |
| 2023/0315851 | A1 * | 10/2023 | Wei | G06N 5/022 |
| | | | | 726/23 |

* cited by examiner

FIG. 7 Network

SYNTHETIC CYBERATTACK TOOL THAT USES A GENERATIVE ARTIFICIAL INTELLIGENCE COMPONENT

RELATED APPLICATION

This application claims priority under 35 USC 119 to U.S. provisional patent application No. 63/470,571, titled "CYBER SECURITY SYSTEM" filed Jun. 2, 2023, as well as to U.S. provisional patent application No. 63/472,227, titled "CYBER SECURITY SYSTEM" filed Jun. 9, 2023, which the disclosures of such are incorporated herein by reference in their entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Cyber security and in an embodiment use of Artificial Intelligence in cyber security.

BACKGROUND

Cybersecurity attacks have become a pervasive problem for enterprises as many computing devices and other resources have been subjected to attack and compromised. A "cyberattack" constitutes a threat to security of an enterprise (e.g., enterprise network, one or more computing devices connected to the enterprise network, or the like). As an example, the cyberattack may be a cyber threat against the enterprise network, one or more computing devices connected to the enterprise network, stored or in-flight data accessible over the enterprise network, and/or other enterprise-based resources. This cyber threat may involve malware (malicious software) introduced into a computing device or into the network. The cyber threat may originate from an external endpoint or an internal entity (e.g., a negligent or rogue authorized user). The cyber threats may represent malicious or criminal activity, ranging from theft of credential to even a nation-state attack, where the source initiating or causing the security threat is commonly referred to as a "malicious" source. Conventional cybersecurity products are commonly used to detect and prioritize cyber-security threats (hereinafter, "cyber threats") against the enterprise, and to determine preventive and/or remedial actions for the enterprise in response to those cyber threats.

SUMMARY

Methods, systems, and apparatus are disclosed for an Artificial Intelligence-based cyber security system.

In an embodiment, a synthetic cyberattack tool uses a generative artificial intelligence component to assist in generating a synthetic cyberattack by a cyber threat to produce one or more cybersecurity incidents and/or events. The synthetic cyberattack tool uses a generative artificial intelligence component also to provide an analysis and an explanation for a purpose of providing cyber security training to at least one of i) an end user of a network and ii) a cyber security team member for the network. The synthetic cyberattack tool cooperates with either or both of 1) a cyberattack simulator and 2) a cloud based war gaming virtual machine platform to perform synthetic cyberattacks in a mimic network. The mimic network can be any of 1) an information technology network, 2) a cloud network, 3) an email network, and 4) other networks corresponding to a portion of an architecture and policies implemented in a real world network that the end user and/or the cyber security team member interacts with. The mimic network of an organization is implemented in at least one of i) an environment of the cyberattack simulator and ii) as virtual machines in a cloud environment of the cloud based war gaming virtual machine platform. The synthetic cyberattack tool orchestrates the deployment, the steps, the objectives, etc., of the synthetic cyberattack in a wargaming cyberattack exercise in the mimic network utilizing the generative artificial intelligence component. The synthetic cyberattack tool derives I) the synthetic cyberattack from real world cyberattacks and II) the wargaming cyberattack exercise from real world behaviors of the end user and/or the cyber security team member as well as the architecture and policies implemented in the real world network that the end user and/or the cyber security team member interact with. The synthetic cyberattack tool has a user interface component that displays both results of testing in the wargaming cyberattack exercise along with an explainability on an understanding by the machine learning analyzing the synthetic cyberattack.

These and other features of the design provided herein can be better understood with reference to the drawings, description, and claims, all of which form the disclosure of this patent application.

BRIEF DESCRIPTION OF THE DRAWINGS

The drawings refer to some embodiments of the design provided herein in which.

Figure 1:
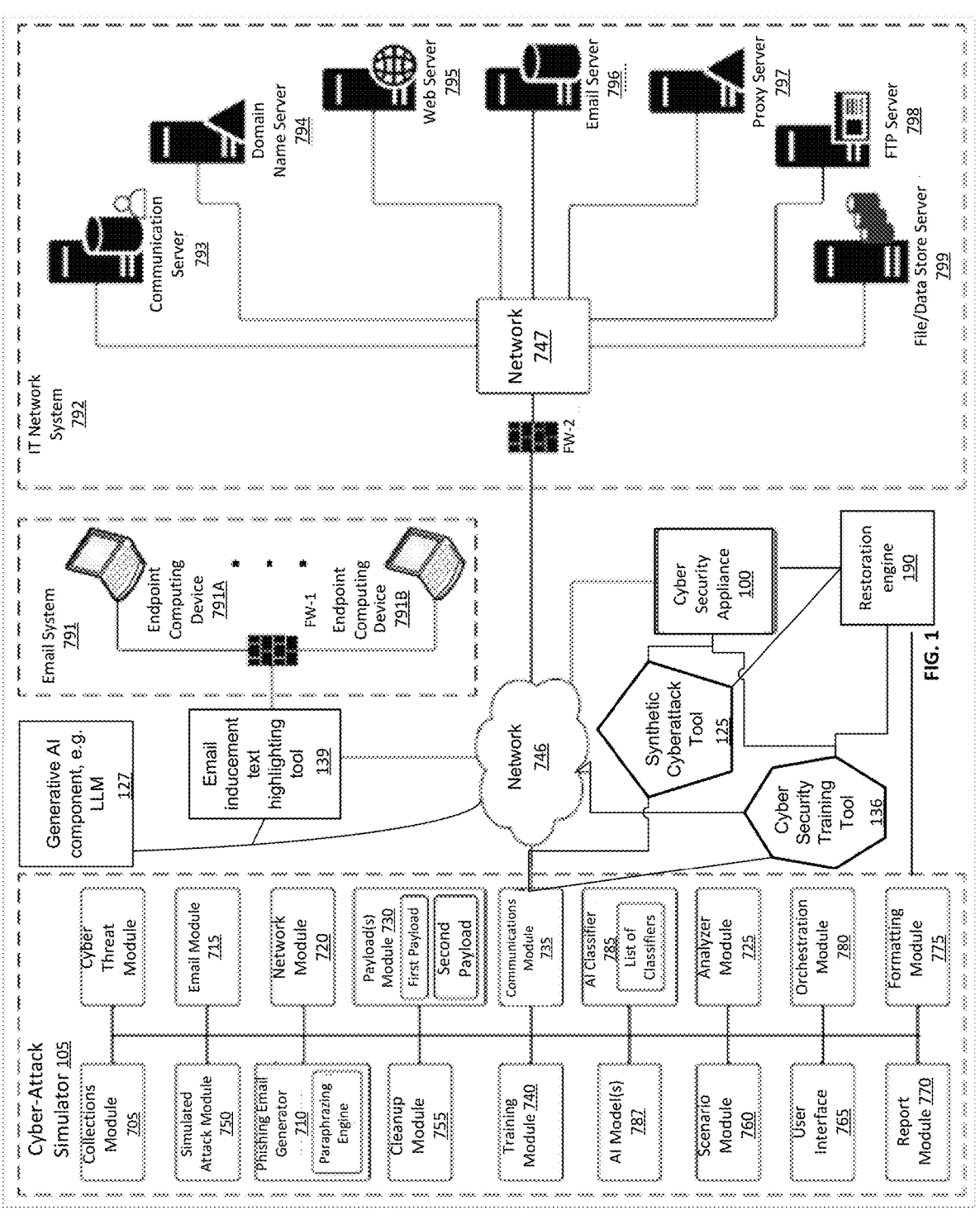
FIG. 1 illustrates a block diagram of an embodiment of a synthetic cyberattack tool and a cyber security training tool that can use one or more large language models and one or more natural language processors with a cyberattack simulator to launch a synthetic cyberattack and/or analyze both real and synthetic cyberattacks.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

A synthetic cyberattack tool uses a generative artificial intelligence component to assist in generating a synthetic cyberattack by a cyber threat to produce one or more cybersecurity incidents and/or events. The synthetic cyberattack tool uses a generative artificial intelligence component also to provide an analysis and an explanation for a purpose of providing cyber security training to at least one of i) an end user of a network and ii) a cyber security team member for the network. The synthetic cyberattack tool cooperates with either or both of 1) a cyberattack simulator and 2) a cloud based war gaming virtual machine platform to perform synthetic cyberattacks in a mimic network. The mimic network (e.g. synthetic network) can be any of 1) an information technology network, 2) a cloud network, 3) an email network, and 4) other networks corresponding to a portion of an architecture and policies implemented in a real world network that the end user and/or the cyber security team member interacts with. The mimic network of an organization is implemented in at least one of i) an environment of the cyberattack simulator and ii) as virtual machines in a cloud environment of the cloud based war gaming virtual machine platform. The synthetic cyberattack tool orchestrates the deployment, the steps, the objectives, etc., of the synthetic cyberattack in a wargaming cyberattack exercise in the mimic network utilizing the generative artificial intelligence component. The synthetic cyberattack tool derives I) the synthetic cyberattack from real world cyberattacks and II) the wargaming cyberattack exercise from real world behaviors of the end user and/or the cyber security team member as well as the architecture and policies implemented in the real world network that the end user and/or the cyber security team member interact with. The synthetic cyberattack tool has a user interface component that displays both results of testing in the wargaming cyberattack exercise along with an explainability on an understanding by the machine learning analyzing the synthetic cyberattack.

FIG. 1 illustrates a block diagram of an embodiment of a synthetic cyberattack tool and a cyber security training tool that can use one or more large language models and one or more natural language processors with a cyberattack simulator to launch a synthetic cyberattack and/or analyze both real and synthetic cyberattacks.

In an implementation, the synthetic cyberattack tool 125 and/or the cyber security training tool 136 can use these one or more large language models and one or more natural language processors with a cyberattack simulator 105 and/or a cloud based war gaming virtual machine platform 60 to produce the synthetic cyberattack for cyber security training. The synthetic cyberattack tool 125 utilizes natural language processing and/or generative AI technologies, such as LLMs, to generate the synthetic cyberattack, such as phishing emails, impersonation emails, advanced persistent threats including ransomware, etc., for the purpose of cyber security educational training of an end user and/or a cyber security team member. As part of the wargaming environment, the synthetic cyberattack tool 125 can cooperate with at least one of a cyberattack simulator 105 and a cloud based war gaming virtual machine platform 60 to deploy a mimic network. The mimic network can consist of one or more of the following networks of 1) an information technology network, 2) a cloud network, 3) an email network, and 4) any combinations of these networks and other networks corresponding to a portion of an architecture and policies implemented in a real world network that the end user and/or the cyber security team member interacts with. The synthetic cyberattack tool 125 can derive I) the synthetic cyberattack from real world cyberattacks and II) the wargaming cyberattack exercise from real world behaviors of the end user and/or the cyber security team member as well as the architecture and policies implemented in the real world network that the end user and/or the cyber security team member interact with. The mimic network of an organization can be implemented in i) an environment of the cyberattack simulator 105 and/or ii) as virtual machines in a cloud environment of the cloud based war gaming virtual machine platform 60.

After the creation of the wargaming environment, the synthetic cyberattack tool 125 and/or the cyber security training tool 136 can work with the cyberattack simulator 105 and/or the cloud based war gaming virtual machine platform 60 to allow autonomous generation of the synthetic cyberattacks and a coordinated series of operations executed by machine learning components working together without the need of human stitching those operations together.

Note, see FIG. 3 for more details, however, generally the cloud based war gaming virtual machine platform 60 can be as follows. The cloud based war gaming virtual machine platform 60 goes out and maps an entire customer's network architecture, including its cloud architecture environment, and works out what network elements connect to other network elements as well as obtains all of the information associated with each network user's account and privileges and then creates a synthetic version of that mimic network. The cloud based war gaming virtual machine platform 60 then deploys one or more autonomous software agents to act as the synthetic cyberattack on the mimic network to behave in a certain malicious way, or a normal way and then in a malicious way so that a security team member can then have a fully realistic scenario of a malicious attack going on within their virtual/simulated network, without worrying about compromising or exposing a vulnerability on their actual real network system. The cloud based war gaming virtual machine platform 60 cooperates with the cyber security training tool 136 and/or the synthetic cyberattack tool 125 to also capture and record the synthetic cyberattack information for the purpose of training non-technical end users as well as security team members.

Referring back to FIG. 1, the cyberattack simulator 105 may be implemented and operated in more detail as discussed further below.

The synthetic cyberattack tool 125 and/or the cyber security training tool 136 can use the generative artificial intelligence component 127, such as a large language model technique, to assist in generating one or more synthetic cyberattacks to produce one or more cybersecurity incidents and/or events within the wargaming environment, direct the steps of the synthetic cyber threat causing those cybersecurity incidents and/or events, and then to provide an analysis and an explanation of those cybersecurity incidents and/or events for a purpose of providing cyber security training to at least one of i) an end user of a network and ii) a cyber security team member for the network. The synthetic cyberattack tool 125 coordinates with the cyberattack simulator 105 and/or the cloud based war gaming virtual machine platform 60 to perform synthetic cyberattacks in the mimic network with an intention behind this synthetic cyberattack is to create realistic scenarios in the domains of, for example, email environments, cloud environments including SaaS environments, IT network environments, other on premise environments, etc. The synthetic cyberattack tool 125 uses the generative artificial intelligence component 127 to orchestrate the synthetic cyberattack, which is grounded in customized contextual data about real world attacks and real world behaviors of the end user and/or the cyber security team member based on a history of that end user and/or that cyber security team member, under analysis, and the architecture and policies implemented in the real world network that the end user and/or the cyber security team member interacts with. The synthetic cyberattack tool 125 use of the generative AI (e.g. LLMs) in, for example, the creation of phishing emails based upon historical information about inducement and/or any kind of style based training as well as the use and steps taken by these autonomous software agents in the wargaming environment is based upon the actual information from customer's environment and then the millions of training cycles of the training data for the generative artificial intelligence component 127.

The synthetic cyberattack tool 125 can also be configured to cooperate with an email inducement text highlighting tool 139. The email inducement text highlighting tool 139 has a natural language processor and a transformer model trained on different types of malicious inducements for email users. The natural language processor is configured to take in the text of an email, under analysis, with the natural language processor to understand both the words in the email and the structure of the fields of the email, and then feed them to the transformer model to understand an intent of the words in the email, under analysis. The email inducement text highlighting tool 139 is then configured to highlight the words and phrases which correspond to different types of inducements: redirection, offers, financial details, instructions, and threats, found in the email under analysis.

On the wargaming side, the trained email inducement text highlighting tool 139 working with generative AI, such as an LLM, may create customized inducement emails, based on the customer specific data derived from the knowledge managed by the cyber security appliance 100, for a simulated attack scenario. The email inducement text highlighting tool 139 can create customized inducement emails for a simulated attack scenario based upon, for example, historic emails (frequency, from whom, style, etc.) for that end user and the history of the end user's interaction with historic malicious emails to generate new bad emails for the synthetic cyberattack. Thus, the synthetic cyberattack tool 125 can cooperate with the email inducement text highlighting tool 139 to create one or more phishing emails and/or any kind of style impersonation based training based upon historical information about types of emails that the end user and/or the cyber security team member, under analysis, has historically received and any inducement within those types of emails, and then to use the phishing emails as part of the synthetic cyberattack in the war gaming environment that is based upon the customer's environment and the training data examples that the machine learning in the large language model trained upon. The synthetic cyberattack tool 125 and the cyber security training tool 136 can contextualize those synthetic cyberattacks so that each one of those scenarios is contextualized to the customer's data, their users, behavior, and the realities of their own infrastructure, which makes much better training than merely on generic examples. For example, the end user may have in the past activated a particular link to make a file transfer between two devices and so the security awareness training now generates new synthetic cyberattacks that involve activating a slightly different link to make a file transfer between two devices and checks whether the end user, undergoing training, falls for the malicious link again. The synthetic cyberattack tool 125 cooperating with the cyber security training tool 136 injects this realism into all of these environments through all of these synthetic attack scenarios through a historical understanding of what is possible in their environment, but also an understanding of what the end user has seen in the previous cyber incidents and their own interactions in the past, etc.

Again, the synthetic cyberattack tool 125 uses techniques that allow for the production of synthetic data based upon a historical understanding, a contextual understanding, and a likelihood of the cyber incident occurring, which is kind of what drives all of these different approaches and the creation of synthetic attacks. The synthetic cyberattack tool 125 cooperating with the cyber security training tool 136 uses an intimate understanding of an organization and its network and/or individuals in the network, rather than just following a pre-programmed scenario.

Not only is the synthetic cyberattack customized in content but also customized in the steps used to carry out the attack. The synthetic cyberattack tool 125 can cooperate with the cyberattack simulator 105, as well as the cloud based war gaming virtual machine platform 60 to autonomously generate the synthetic cyberattack incidents, which are dynamically generated to perform steps of the cyberattack based on a current status of components in the wargaming environment and counter measures taken, as current actual vulnerabilities and known behaviors of the end users at the time the decision for a step in the cyberattack is being made versus some hard coded example pre-programmed scenarios. The synthetic cyberattack tool 125 can cooperate with the generative artificial intelligence component 127 to have the ability to generate realistic synthetic cyber incidents based upon a historic understanding of real incidents seen in the wild, and an understanding of the devices within the network and the ability to interact with semi or fully autonomous software agent by the LLMs in a mimic network (e.g. mirrored with real data corresponding to the actual network environment of the customer). The synthetic cyberattack tool 125 can generate content as well as then evaluate each step taken for the wargaming cyberattack exercise, based upon actual conditions at that time the decision is being made, on a mimic network implemented in at least one of i) an environment of the cloud based war gaming virtual machine platform 60 and an environment of the cyberattack simulator 105. The training provided to the end user and/or security team is for the purpose of preparing before a real cyberattack takes place.

The synthetic cyberattack tool 125 can include an attack engine configured to deploy a cyber threat to use an exploit that can be tested and interacted with during the wargaming cyberattack exercise in the mimic network deployed by the synthetic cyberattack tool 125.

The synthetic cyberattack tool 125 can use the generative artificial intelligence component 127, such as an autonomous agent large language model, as an orchestrator to collect historical data i) on cyberattack incidents within the real world network that the end user and/or cyber security team member interacts with, as well as on cyberattack incidents from one or more third party threat landscape platforms to select what type of cyberattack will be generated in the synthetic cyberattacks, ii) to correlate disparate steps taken by the synthetic cyberattack in the cyberattack simulator 105 and/or the cloud based war gaming virtual machine platform 60 based upon previous cyberattack incidents, including information about detections and model breaches, that have happened, as well as take in information about actions taken to mitigate the synthetic cyberattack that are currently in place, and then suggest what step to take to advance the synthetic cyberattack, and then subsequently explain cyberattack steps in the synthetic cyberattack based on vulnerabilities found and actions taken to mitigate the synthetic cyberattack in a natural language format, as well as steps that a human needs to take to mitigate and remediate to reduce risk. The LLM in the synthetic cyberattack tool 125 can make decisions on what is important and what is not, and when it should be applied in a logical way based upon its initial training from the training data trained upon and factoring in the actual history of this specific end user/security team member and the actual history of this specific network. The synthetic cyberattack tool 125 uses the autonomous agent LLM as a correlation engine because it has strong abilities to correlate, as a data transformation tool, and finally, as a form of natural language processing to turn data about breaches and vulnerabilities as well as captured meta data from the synthetic attack into information that the LLM can understand and analyze on a consistent basis. All the data need not be preformatted into a single consistent form prior to developing an understanding but rather as a natural language processor the LLM has a built in ability to understand a concept being conveyed even when the words and format types differ from each other.

Again, the generative artificial intelligence component 127 can query the cyber security appliance 100 and/or look into the data store for previous analyst incidents and types of model breaches that the network including its end users, under analysis, has observed in the past. For example, in the email behavior the cyber security training tool 136 checks history to know that this end user has received inducement emails (e.g., a lot of crypto offers). The generative artificial intelligence component 127 with the cyber security training tool 136 and/or the synthetic cyberattack tool 125 can then orchestrate and cooperate with the cyberattack simulator 105/cloud war gaming platform 60 in order to produce the synthetic attack, for example, in the form of an inducement email sent to this end user and/or security team member, who typically received these type of emails, as well as user's who have rarely seen this type of cyberattack inducement emails, and then run the likely wargaming scenario in the simulator/virtual machine cloud environment, step by step, and then produce customized training content that highlights the factors that they need to worry about, based upon that kind of personalized profile, drawing upon all of those factors that the system drew from different parts of the cyber security appliance 100 and other engines.

Another example for training could be 1) users who have and 2) some users who have not, downloaded malicious executables (e.g., click on this link), as part of a malicious cyber threat. Another example could be whether an end user previously affected by a particular cyberattack invoked through an Office 365 document, and then the cyber security training tool 136 can present a similar cyberattack with slightly different information (e.g., previously had a cyberattack via an Office 365 document but now this time it is a Google Doc). The cyber security training tool 136 can check whether that end user will recognize a similar cyberattack the next time around as well as expose end users who have not been previously affected by that particular cyberattack. Does the end user fall for this synthetic version of cyberattack possibly again and then the cyber security training tool 136 can provide immediate on the spot visual training to that end user on why that cyber threat in the Google Doc was identified as bad.

The synthetic cyberattack tool 125 and/or the cyber security training tool 136 can cooperate with the cyberattack simulator 105 to provide attack path modeling data that is incorporated in by the synthetic cyberattack tool 125 such that a realistic likelihood is injected to an attack path route chosen corresponding to the real customer environment. The synthetic cyberattack tool 125 is configured to cooperate with the cyberattack simulator 105 to provide attack path modeling data that is incorporated in by the synthetic cyberattack to assist in choosing a particular attack path route through the mimic network based on actual vulnerabilities in the corresponding real world network. The synthetic cyberattack tool 125 can interact with one or more data stores which have information about previous emails, received information about previous AI analyst incidents, information about restoration from cyber incidents and decisions made as a result of those, information about an architecture in the network that the end user interacts with, and information about the end user and their behavior in the network under analysis in order to inject realism into the synthetic cyberattack through a historical understanding of what is possible in the network of the end user and/or the cyber security team member, but also an understanding of a context of previous cyber incidents that have actually occurred in the network of the end user and/or the cyber security team member. The data store has information about the architecture that the end user interacts with and information about the end user under analysis.

Again, the synthetic cyberattack tool 125 can use LLMs to enhance cyber security measures by simulating attack scenarios and then facilitating customized training to the receptive audience of the end user and/or security team. In another example, the synthetic cyberattack tool 125 can use LLMs trained on a user's style of email writing and formatting to generate plausible phishing emails in their "voice." This approach can be utilized with i) the environment of the cyberattack simulator 105 and/or ii) virtual machines in the Cloud environment engagements to create realistic phishing simulations and raise user awareness about potential threats. Additionally, the cyber security training tool 136 can employ LLMs to detect anomalies in email communication by comparing the actual emails with those predicted to be typical for a specific user. This comparison helps identify potentially malicious emails that deviate from the user's usual patterns.

The synthetic cyberattack tool 125 can cooperate with the cyber security training tool 136 to facilitate a user's style transfer for emails to generate plausible phishing. The system trains an LLM on each user's style of email writing (including the underlying formatting) and then uses the LLM to generate convincing phishing emails in their "voice" as part of synthetic cyberattack engagements.

Similarly, the cyber security training tool 136 can apply this technique with a trained LLM on real world emails received by an end user as a detection approach—i.e., how much does this actual email differ from that which would be "predictable" for this other email user. The cyber security training tool 136 can apply this technique with a trained LLM on real world emails to identify impersonation emails on real world emails and use the email inducement text highlighting tool 139 to analyze malicious emails and identify the impersonation portions, to protect email users and train them.

The synthetic cyberattack tool 125 and/or the cyber security training tool 136 can truly provide a kind of wargame environment that reflects the reality of the network of the end user and/or the cyber security team member to provide incredibly valuable tailored/customized training based on stored information from the AI analyst, the cyber security appliance 100, email system, etc. vs generic training to end up with something that's a lot more realistic and unpredictable.

In another example, the synthetic cyberattack tool 125 can use the generative artificial intelligence component 127, such as an autonomous agent large language model trained on graphs describing a security compromise produced by a human cyber security analyst, in order to then produce a graph for the synthetic cyberattack, and then follow nodes of the graph for steps in the synthetic cyberattack in the mimic network. A cyberattack simulator 105 can use an autonomous agent LLM trained on cyber security analyst graphs describing a security compromise, that the system has either 1) ever seen or 2) at least seen within a certain time limit. In an example, the autonomous agent large language model first takes in the AI analyst graphs describing a security compromise produced by the cyber security analyst and then produces a graph for the synthetic cyberattack. Next, the synthetic cyberattack tool 125 can then convert those graphs to an equivalent text representation. The text representation might say, for example, this device did this, then this cyber threat compromised this node initially and then migrated to this device, etc., etc. The textual sentence produced is a string of codes describing aspects of a cyber compromise. The string of codes, for example, further includes—edge type, from this node type to this node type, the indexes of those devices involved in the compromise, type of compromise. Next, the system trains the large language model on these sentences/textual representations derived from graphs describing a security compromise produced by the cyber security analyst, so that the LLM can deduce how these attacks are structured. Next, once the neural networks forming the artificial intelligence have learned how to understand graphs that describe a security compromise, then the synthetic cyberattack tool 125 can work the LLM to take the next step and train on how to generatively produce graphs that describe how to make a security compromise. Thus, cyberattack simulator 105 can use an autonomous agent LLM trained on cyber security analyst graphs describing a security compromise to then produce a graph for a proposed simulated/synthetic cyberattack and then evaluate each step in an ongoing synthetic cyberattack to the current conditions in the mimicked network.

The sentence produced is a string of codes describing an aspect of a cyber compromise, which is then what is visually represented in the produced graph. Each node and edge in the graph are then populated with the actual metadata from actual cyber incidents with can be used and referenced in the produced synthetic cyberattack.

In another example, the synthetic cyberattack tool 125 is configured to use a message passing neural network and/or an AI transformer to simulate attacks. This form of the neural net is specialized to create graph structures. Therefore, it can be successfully trained on the graph structure of AI Analyst incidents in a customer environment and then used to generate convincing synthetic incidents, using graphs generated from the LLM for the purpose of simulating an incident and response, tailored to the client environment. By training these message passing neural networks on the graph structure of AI Analyst incidents in a customer environment, synthetic incidents can be generated. These synthetic incidents simulate real-world attack scenarios tailored to the client's environment, enabling organizations to simulate incident response and test the effectiveness of their security measures.

The cyber security training tool 136 and the synthetic cyberattack tool 125 can utilize an autonomous agent large language model. Autonomous agent based large language models (LLMs), like Auto GPT, autonomously chain together tasks to achieve a big-picture goal set by the user. The autonomous agent based LLM can be leveraged to simulate attack scenarios by working together and feeding back into themselves. The autonomous agent based LLMs can work together and feed back into themselves to perform long complex tasks during a simulated cyberattack, as such, they can simulate a cyber threat in an environment. For example, an autonomous agent based LLM placed on an isolated AWS EC2 instance can execute system commands to determine the operating system, make curl requests to check connectivity, and even attempt to exfiltrate information. The autonomous agent based LLM on the AWS EC2 instance follows the situation to exfiltrate key information and then as much information to a certain endpoint. The LLM agent on the AWS EC2 instance uses system commands to work out what OS it is on, curl requests to check connectivity, if it knows it is on an AWS EC2 instance might make requests to IMDS for credentials, etc.

This simulation provides organizations with insights into potential attack vectors and helps in refining their defensive strategies.

Intelligent Customized Training Scenarios

Next, the cyber security training tool 136 can use LLMs to generate long-form content customized to meet the specific needs of customers. By providing relevant information, such as connections blocked for suspicious websites or unusual file downloads, an LLM can create training plans and materials tailored to individual users. These materials can help users become more security aware and educate them about potential risks and best practices.

Thus, the LLMs can take prompts of what the system already knows about the organization and its users to produce long form content that is customized to be relevant to our customers' needs. The more information the LLM has been provided, the better the content will be. For example, the synthetic cyberattack tool 125 can feed the LLM data from the AI models' 160 knowledge about the normal pattern of life and the generated autonomous responses with the cyber threat autonomous response engine 140. Given that the end user had connections blocked for dodgy websites, the end user received the following bad emails, and the end user had the following unusual file downloads, the LLM can then produce a customized training plan and training materials for each user that can be sent to help them become more security aware.

The cyber security training tool 136 can utilize synthetic approaches to train (e.g., educate) at least one of i) an end user of a network and ii) a cyber security team for the network to provide analysis for the purpose of training, but the content being analyzed itself may not be synthetic generation but in fact real world emails, websites, documents.

The cyber security training tool 136 can utilize an autonomous agent large language model and the synthetic cyberattack tool 125 to produce an attack scenario with steps directed by autonomous agents in the synthetic version of the client's cloud environment in the mimic network in the environment of the cloud based war gaming virtual machine platform 60 and/or the environment of the cyberattack simulator 105. Again, the autonomous agent large language model, for example, could be like GPT's autonomous agents.

The cyber security training tool 136 can cooperate with the synthetic cyberattack tool 125 to utilize the generative artificial intelligence component 127 to produce tailored contextual training for an end user and/or cyber security team member. The generative artificial intelligence component 127 can produce training scenarios that an end user and/or cyber security team member interacts with. The security member interacts with a synthetic incident in a synthetic version of their network environment that they try to secure.

The cyber security training tool 136 can use the set of artificial intelligence models trained on a normal pattern of life of entities in the organization's environment 160 and its associated machine learning utilizing cybersecurity data and an innate pattern of life awareness to generate compelling customized training in both content and scenario basis.

The cyber security training tool 136 is configured to have a natural language processor and a large language model to analyze both a synthetic cyberattack as well as a real cyberattack, and then to provide analysis and an explanation of why machine learning identified the synthetic cyberattack and/or the real cyberattack as a cyber threat for a purpose of providing cyber security training to at least one of i) an end user of a network and ii) a cyber security team for the network.

The cyber security training tool 136 can use a large language model trained as i) a data transformation tool to understand and transform the machine learning analysis, the model breaches, and the log data in their natural formats from the synthetic cyberattack and ii) apply natural language processing in order to turn data about the machine learning analysis, the model breaches, the AI Analyst incidents, and the log data from the synthetic cyberattack into information in a natural language format in order for the end user and/or the cyber security team member to understand the analysis and the explanation as to why the machine learning identified the synthetic cyberattack and/or the real cyberattack as the cyber threat in order to train the end user and/or the cyber security team member. The cyber security training tool 136 uses the large language model i) as a data transformation tool and ii) to apply natural language processing to turn data collected from the wargaming cyberattack exercise and then explain in natural language format the attack steps in the synthetic attack based on vulnerabilities utilized and the autonomous responses that were taken in the wargaming cyberattack exercise and suggest the steps that the cyber security team member needs to take to mitigate and remediate to reduce risk.

The cyber security training tool 136 can use a large language model trained to generate software code that creates data visualizations, including at least one of graphs and charts, showcasing cyber security breaches, user activity, and current cyber threat trends. This capability simplifies the presentation of complex data, enabling stakeholders to grasp key insights quickly.

The cyber security training tool 136 can cooperate with the synthetic cyberattack tool 125 and at least one of a cyberattack simulator 105 and/or a cloud based war gaming virtual machine platform 60 to produce synthetic cyberattack scenarios showing the cyber security team member where in the network that they are vulnerable and why they are vulnerable. That gives security teams the ability to engage with synthetic malicious actors and allows them to properly understand the possible ways in which their network environment could be compromised without having to actively observe the real world network environment being compromised.

Again, the cyber security training tool 136 can cooperate with an email inducement text highlighting tool 139. The cyber security appliance 100 can detect cyber security threats introduced via the email system. The email module in the cyber security appliance 100 can cooperate with the email inducement text highlighting tool 139. The email inducement text highlighting tool 139 also then obtains and factors in a real historical understanding of the types of emails that this specific user, under analysis, receives. The email inducement text highlighting tool 139 takes in the text of the email with a natural language processor and highlights words and phrases which correspond to different types of inducements: redirection, offers, financial details, instructions, and threats. The email inducement highlighting tool highlights the text in the email that the machine learning identified in determining that this email is a malicious inducement and this type of inducement. This highlighting is to allow customers to see why a specific email has been flagged by the email security product. The email inducement text highlighting tool 139 has a user interface that allows the end user and/or security team member to visually see what does the cyber security appliance 100 think, e.g., machine learning analysis, about this email under analysis. The user interface then explains with text and displays why is this email under analysis is malicious because it is attempting to induce the email user to do a harmful act to them. The email inducement text highlighting tool 139 has a user interface to visualize through highlighting identified malicious portions of an email under analysis for a purpose of providing training to the end user. The user interface is configured to explain and display why this email under analysis is malicious because it is attempting to induce the end user to do a harmful act. The email inducement text highlighting tool 139 has a user interface to provide immediate on the spot feedback on a display screen of the end user during their routine work activity (outside the setting of a formal cyber security training session) within a software application (e.g., email application, browser itself) the end user is using on why machine learning believes that this email, under analysis, is malicious versus generating a long form written and printed report days later on why the machine learning believes that this email, under analysis, is malicious. The user interface visually and textually shows why a new email to the user is an inducement email attempt to induce a particular type of inducement with the key text highlighted. The email inducement text highlighting tool 139 can provide user training both i) in a cyber security training session to educate a group of email users on cyber security as well as ii) on the spot on the display screen of the end user during their routine work activity (outside the setting of a formal cyber security training session.

The email inducement text highlighting tool 139 can also create generative phishing technology based upon all of the factors including historic information about emails. The email inducement text highlighting tool 139 can have a transformer model that also has a built in AI classifier that classifies the malicious wording as well as detects wrong/ slightly different wording when analyzing user style (to detect real world malicious emails that include malicious inducements), both trained on historic AI cyber analyst incidents in order to be able to produce nuance that is compelling in the training on the spot of a real or synthetic email under analysis and/or generated phishing email attack. The transformer model cooperates with the data store that has information about the architecture of the network that the end user interacts with and information about the end user under analysis. The cyber security training tool 136 is configured to cooperate with an email inducement text highlighting tool 139 to analyze malicious emails based upon historic information about one or more malicious inducements as well as phishing emails impersonating a style of another email user and provide training to the end user upon detecting the malicious inducements or emails impersonating a style of another email user.

The cyber security training tool 136 can use the large language model trained to output a color coded visualization of i) an inducement email with a malicious inducement portion directed to an email user identified ii) a phishing email impersonating a style of another email user with differences from the style of the other email user identified, or iii) a combination of both i) and ii). The generative AI component can include a custom transformer graph neural network message passing network to generate synthetic alerts and synthetic cyberattack incidents including synthetic phishing emails. The cyber security training tool 136 can produce an annotated, analyzed version of a real phishing email received by the end user.

The cyber security training tool 136 can utilize the generative AI technologies to produce tailored contextual training for an end user and also to produce training scenarios that an end user interacts with. The cyber security training tool 136 is trained to deduce and then categorize the end user as, for example, a standard business employee/ regular employee who's interacting with, for example, an email system that tells them why a particular email has been blocked during a synthetic incident in their cyber security system as well as on the spot training during routine working hours and activities on why a received email is malicious. The cyber security training tool 136 is trained to deduce and then categorize a person as part of the cyber security team and/or a technically trained/advanced end user who generally are less susceptible to certain types of malicious cyber threats. Thus, the cyber security training tool 136 can also provide training on its own as a result of real malicious activity that has been detected.

Next, the cyber security training tool 136 analyses a machine learning analysis and translates that to provide explainability by identifying the text, symbols, and images identified as the clues the detect engine identified something as a potential cyber threat and then puts out different colors to identify these clues, and shows the color coded visual to the user. The cyber security training tool 136 surfaces the detected malicious email to the end user with the color coded visualization. In addition, next to the email, the cyber security training tool 136 will show the tags of the inducement that the transformer has identified along with potentially a confidence score on the assigned inducement classification. The user can, for example, double click on the email, and then the user will see the color coded explanation on their display screen.

Next, the cyber security training tool 136 can have an add-in extension configured to be installed in a software application. The software application can be, for example, i) an email application (e.g., where the add-in extension is installed in the user's inbox of their email application), ii) a cyber security application (e.g., where the add-in extension is installed in the user interface of the cyber security application), and iii) a browser application (e.g., where the add-in extension is installed in the user interface of the browser application) such that the end user can activate the add-in extension to query whether something (email, URL, document, etc.) is malicious and have the user interface display why the something under analysis is or is not malicious.

The cyber security training tool 136 can provide a narrative breakdown such as the email 'is fine' or the email is bad because, for example, the end user has not really spoken to this person very much, and/or the email user is not in the same company/organization, and/or the email contains these specific words forming a potential inducement type of email, and then show all of these factors that the cyber security training tool 136 has deduced to the end user. The cyber security training tool 136 actually exposes the inducement reasoning. Thus, the cyber security training tool 136 can have a user interface component that displays security awareness training for both a synthetic-based cyberattack and a real cyberattack and then shows the end user the machine learning understanding of the synthetic-based cyberattack and/or the real cyberattack displayed in the user interface component.

Next, the cyber security training tool 136 can use the large language model trained to use Artificial Intelligence to deduce a level of cyber security sophistication of the end user and/or cyber security team member out of multiple different levels of sophistication, such as three different levels of sophistication 1) regular end users of a network, 2) end users with a technical background within a network/audit team of a network, and 3) a security team member for the security team for that network, and then tailor training and a way that the cyber security training tool 136 is explaining things to that deduced level of sophistication of that end user/security team member. Based upon the profile of the end user (team/group the end user is in, what their job role, etc.), at issue, the cyber security training tool 136 uses this to perform a basic classification and tag that user with the corresponding tag—e.g., an end user with a technical background. The cyber security training tool 136 produces customized training, as opposed to generalized training, which pulls in all of the factors that the system knows about an individual being trained, such as the attack paths through the network associated with that individual, from the cyber-attack simulator 105, as well as a network behavior of the end user/security team member from one or more AI models modeling the normal behavior 160 of that individual. The cyber security training tool 136 can cooperate with the one or more AI models modeling the normal behavior 160 of that individual to deduce whether the end user is classified as a regular end user or an end user with a technical background because, for example, deduced from the AI models modeling the normal behavior of that individual that this end user regularly interacts with files from Dropbox, and they are in the engineering group.

The cyber security team member on the user interface from the cyber security training tool 136 is able to view a log format of a play by play behaviors, model breaches, an output of misconfigurations, such as which misconfigurations were invoked in the synthetic cyberattack, and what methodologies and policies did the autonomous software agents use to move around in the synthetic cyberattack. Thus, the user interface outputs what was exploited; and then, how to prioritize in a sea of misconfigurations which ones would most likely be actively exploited and need to be resolved. In addition, an LLM-based report generator produces a full formal write up of how the synthetic attack played out, and/or how the real attack played out, and the other details discussed herein. The write up produced for the end user and/or cyber security team member being trained allows them to draw conclusions on how to prevent future real cyber incidents, and ensure that real incidents that have happened are not repeated. The cyber security training tool 136 can produce this content through the generative artificial intelligence component 127 and can be customized to the end user, to the context in which it is produced, the scenario, and also be tailored to the technical level of the end user consuming this training.

Training and Fine Tuning

The generative artificial intelligence component 127, such as the large language model, can understand and generate human-like language and the associated generative AI-creating algorithms can generate new content based on patterns learned from existing data. The large language model can be AI algorithms that have been trained on a large amount of text-based data, typically scraped from the open internet such as webpages and sources such as scientific research, books, forums, or social media posts. However, for better performance of the LLM to carry out its intended functions, the LLM can be trained on cyber security specific material in the format that the cyber security material is natively recorded. The generative artificial intelligence component 127 can be an AI system that's primary function is to generate new content (e.g., images, music, speech, code, video, text, etc.). Large language models (e.g., GPT-3, PaLM, LLaMA) can be the underlying technology behind the generative artificial intelligence component 127. Again, the LLM can be fine-tuned in their training for uses in the cyber security system to make more accurate predictions and more relevant training. The cyber security system can use LLMs to enhance cyber security measures by simulating attack scenarios and facilitating customized training.

Next, training of the email inducement highlighting tool can work in the following way. Firstly, several thousand customer emails, which were flagged by the email security products as malicious inducement emails, and the different types of malicious email inducement were taken as training data. (Similar training occurs for detecting impersonation emails copying another email user's style.) Next, unlock certain parameters, tasks, and/or layers in the machine learning to have their learning weight associate with that parameter, task, or layer refined in light of the subsequent training cycles while the remaining parameters, tasks and layers that were previously trained remain locked. Next, fine tune the training of each LLM to detect certain categories of emails that people are receiving and then give them training on that. Collect tens of thousands of emails which have met hard coded logical rules, for example, human analysts have confirmed that they really believe this training email was an inducement email and/or have previously been identified as a particular category of malicious email. The emails can be labeled as that type of email and/or for, for example, inducement type emails labeling phrases that were thought to be part of the inducement. The training process then labels phrases within the emails that corresponded to the inducement, set out in the subject matter and body discussion with the email security product. The email inducement text highlighting tool 139 trains with a lot of emails that have been identified by an email security product to try a certain thing to like, induce bad actions by the end user, some were mere spam, induce the email user to send crypto or other money to a bad actor. The known data on the malicious inducement emails and the different types of malicious email inducements are labeled for training data. The natural language processor and transformer model of the email inducement highlighting tool train on identifying inducement phrases in parts of the email using that labeled data. The LLM is trained against built up labelled sets of different types of malicious emails with their malicious parts of text, images, symbols, etc. labeled/identified. Fine tune the training on the LLM to make a decision for each individual item, e.g., each word, image, or symbol, and then on all of them put together as a whole. The training process for the email inducement highlighting tool then takes a large transformer model (for example, BERT) and trains the transformer model (e.g., AI classifier with additional layers) to accurately predict the inducement labels in a named entity recognition task. (Transformers can be a type of neural network architecture that transforms or changes an input sequence into an output sequence.) During deployment, any new email is analyzed by the email inducement highlighting tool, and it will highlight with quite high accuracy phraseology in that email that indicates that the user is being induced to do something bad and/or classify the email as benign and/or mere spam.

After training and thus during deployment, email users will be able to query the transformer model regarding the email under analysis and then the transformer model will return a color highlighted analysis of the text highlighting phrases of interest with the corresponding labels on the user interface. The user interface visually and textually shows why a new email to the user is an inducement email attempt to induce a particular type of inducement with the key text highlighted.

On the wargaming side, a trained email inducement highlighting tool working with generative AI, such as an LLM, may create customized inducement emails for a simulated attack scenario.

A distinction between previous generations of synthetic attack by the cyberattack simulator 105 is that the cyberattack simulator 105 runs and then informs the cyber security team about all different types of attack that could happen and all of the different paths that each cyberattack could take and then rank the most likely attack paths and likely cyberattacks that the network is vulnerable to; whereas now the synthetic cyberattack tool 125 cooperating with the cyber security training tool 136 with the autonomous agent LLM with the cyberattack simulator 105 is doing one particular synthetic attack scenario with a likely attack path, and then the connections and activity and things that might fall into this particular synthetic attack level kind of relations between objects as part of a compromise, take information about an end users behavioral patterns, factor in actual cyber incidents that have occurred upon this network in the past, the types of model breaches that we've observed, etc., and then record the interactions with each other, which then must explain in a training sense what these simulations populated with specific customer network and user's information will reveal. The autonomous agent LLM orchestrates a cyber threat in a synthetic attack to 1) crawl around a mimic network of the customer's environment in an AWS environment of the cloud based war gaming virtual machine platform 60 as part of a wargaming cyberattack exercise, and/or 2) attack an edge in a simulation of the customer's network environment, including Cloud, SaaS, email, IT, etc.) and proceed through attack paths through that customer's network environment. Capture the information about the synthetic attack and a series of factors about users, behavior derived from the autonomous agent LLM orchestrating with the cyberattack simulator 105/cloud war gaming platform in order to generate training content for them. The autonomous agent LLM orchestrates a cyber threat in a synthetic attack with the cyberattack simulator 105/cloud war gaming platform as a piece of software where they are calling to each other, retrieving data, getting data from each other and then generating an appropriate action, evaluating that action, and moving onto the next step of progression of the synthetic attack and repeat the process of calling to each other, retrieving data, getting data from each other, evaluating and determining the most likely and appropriate action/step in the synthetic attack. All based upon ingesting and learning off of the normal behavior within that actual network.

Figure 2:
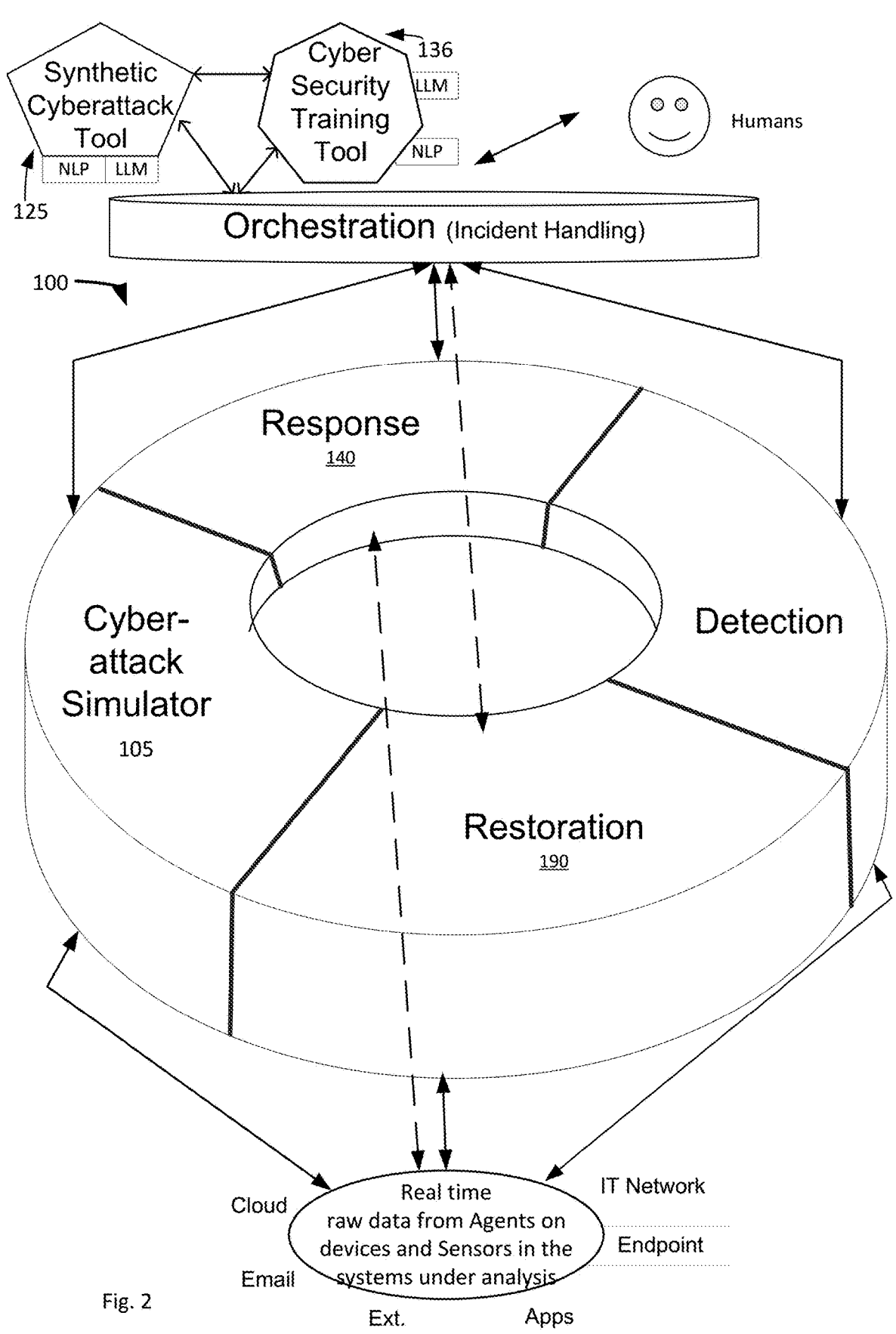
FIG. 2 illustrates a block diagram of an embodiment of a synthetic cyberattack tool and a cyber security training tool that can cooperate with each other as well as the cyber security appliance with its cyber threat detect engine, the cyber threat autonomous response engine, the cyberattack simulator, the cyber-attack restoration engine, and the artificial intelligence-based cyber threat analyst module to train and protect against cyber threats.

FIG. 2 illustrates a block diagram of an embodiment of a synthetic cyberattack tool and a cyber security training tool that can cooperate with each other as well as the cyber security appliance 100 with its cyber threat detect engine, the cyber threat autonomous response engine 140, the cyberattack simulator 105, the cyber-attack restoration engine 190, and the artificial intelligence-based cyber threat analyst module 120 to train and protect against cyber threats. For example, the cyber-attack restoration engine 190 (e.g., Heal) can be queried by the synthetic cyberattack tool 125 and a cyber security training tool 136 to obtain information about ongoing cyber incidents and decisions made as a result of those real world incidents that this network under analysis has seen.

The synthetic cyberattack tool 125 and the cyber security training tool 136 can each use its own large language model and its natural language processor to communicate and cooperate with at least one of the cyber security appliance 100 with its cyber threat detect engine, the artificial intelligence-based cyber threat analyst module 120, the cloud domain module 145, and the email domain module 150, the cyber threat autonomous response engine 140, the cyberattack simulator 105, and the cyber-attack restoration engine 190, when using the large language model to interact with the cyberattack simulator 105 and a cloud-based war gaming virtual machine platform 60. Note, as shown in FIG. 2, the generative artificial intelligence component 127, such as an LLM, can be internal to the synthetic cyberattack tool 125 and/or the cyber security training tool 136; or as shown in FIG. 1, external to these components and merely in communication with the synthetic cyberattack tool 125 and/or the cyber security training tool 136.

Again, the synthetic cyberattack tool 125 and the cyber security training tool 136 can check to see the end user's history to understand real world attacks that each specific user has experienced and that the network in general has experienced. Next, if the end user has experienced the malicious attack type before then do it again in the training session and see if the end user will fall for it again to provide tailored contextualized training material, whether that is synthetically generated in long form version or on the spot short form version. Again, the synthetic cyberattack tool 125 and the cyber security training tool 136 can dynamically generate training and a synthetic attack versus training material that is pre-formatted with pre-written scenarios used for training, and then as well customize the security language chosen for different levels of sophistication/types of users from end users to the security team.

How do we learn from this restoration incident from the cyberattack so that we do not make the same mistakes again? The cyber security training tool 136 is configured to provide training that is realistic. Even, though it is not the traditional security awareness training for an end user, which occurs in a training setting away from their routine workstation. Also, the cyber security training tool 136 provides preemptive cyber training so that a security team can practice realistic environments in a mimic of their network, so that the security team can be prepared if something like that type of cyber attack were to happen and then practice how to best to restore the network during an ongoing cyberattack.

Figure 3:
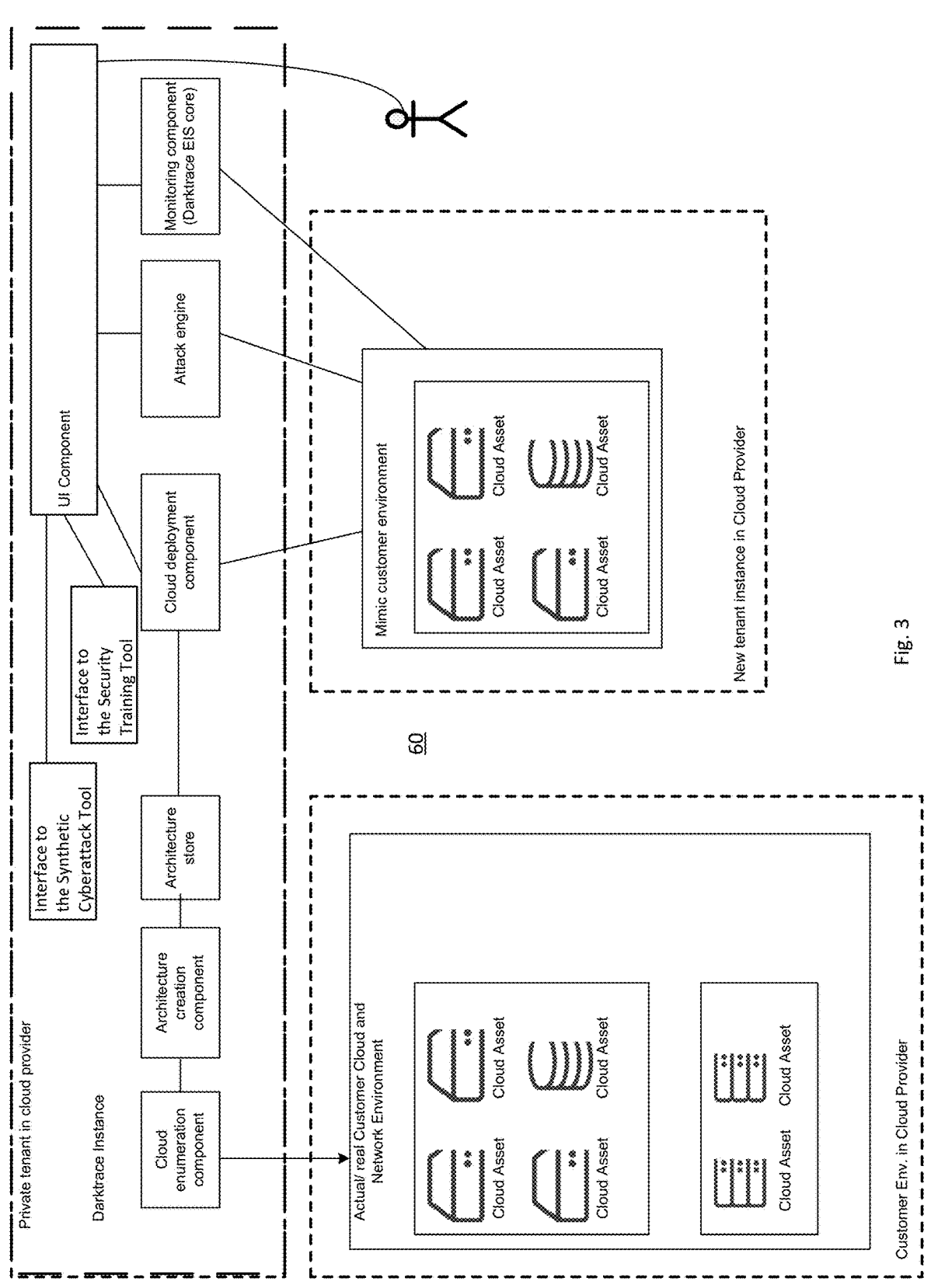
FIG. 3 illustrates a block diagram of an embodiment of a synthetic cyberattack tool and a cyber security training tool that can use one or more large language models and one or more natural language processors to be utilized with a cloud based war gaming virtual machine platform to allow autonomous generation of the synthetic cyberattacks and train.

FIG. 3 illustrates a block diagram of an embodiment of a synthetic cyberattack tool and a cyber security training tool that can use one or more large language models and one or more natural language processors to be utilized with a cloud based war gaming virtual machine platform to allow autonomous generation of the synthetic cyberattacks and train. The cyber security training tool 136 can cooperate with the cloud based war gaming virtual machine platform 60. The training with the synthetic cyber incident which an end user and/or security team member interacts with during the training uses historical data about cyber security incidents that have previously occurred within the synthetic version of the network environment that the end user and/or security team member interacts with. Likewise, the synthetic cyberattack tool 125 can cooperate with the cloud based war gaming virtual machine platform 60.

Additional Details

The following text below discusses how some of the other components in the cyber security system operate; and thus, how these components respond to the commands, requests, and communications from the cyber security training tool 136 and/or the synthetic cyberattack tool 125.

Summary of how the Cloud Wargaming Tool Works

An example Artificial Intelligence-based cyber security system can include multiple Artificial Intelligence-based engines that cooperate to identify a cyber threat, mitigate that cyber threat and other cyber threats, restore from that cyber threat and other cyber threats, and factor in simulations of cyber threats. In an embodiment, an automated sandbox generator for a cyber-attack exercise on a mimic network in a cloud environment can include a cloud deployment component, an attack engine, a monitoring component, and a user interface component configured to cooperate with each other. The cloud deployment component can provide an automated solution to deploy the mimic network, which consists of a portion of 1) an information technology network, 2) a cloud network, 3) an email network, or 4) a combination of all three, in a sandbox environment in the cloud environment, where the mimic network is i) a clone of some subset of components from 1) the information technology network, 2) the cloud network, 3) the email network, or 4) the combination of all three, that exists in an organization's environment, ii) a subset of predefined example components found in network architectures, or iii) some combination of both. The cloud deployment can utilize a sandbox creator to create a sandbox environment in the cloud environment. The attack engine can deploy a cyber threat to use an exploit that can be tested and interacted with, via an automated sandbox generator for a wargaming cyber-attack exercise, during a wargaming cyber-attack exercise in the mimic network deployed by the cloud deployment component. The synthetic cyberattack tool 125 is configured to cooperate with the cyberattack simulator 105 and/or the cloud based war gaming virtual machine platform 60 to communicate with a series of sensors deployed in the mimic network in i) the environment of the cloud based war gaming virtual machine platform 60 and/or ii) the environment of the cyberattack simulator 105 to collect data produced during the wargaming cyberattack exercise, as well as retrieve historical data on a) the real world network, b) the end user, and/or c) the cyber security team member from a data store to utilize this data during the wargaming cyber-attack exercise. The synthetic cyberattack tool 125 and the cyber security training tool 136 can each have its own user interface component configured to display results of testing in the wargaming cyber-attack exercise be displayed in the user interface component along with explainability on a machine learning understanding of the synthetic cyberattack. A user interface component can communicate with the monitoring component to display results of testing in the wargaming cyber-attack exercise be displayed in the user interface component, where the monitoring component is configured to utilize an existing set of artificial intelligence models trained on a normal pattern of life of entities in the organization's environment and its associated machine learning. The user interface can display, in real time, parameters, messages, model breaches, and other results of the wargaming cyber-attack exercise being conducted in the sandbox environment, to create a behavioral profile of how the cyber threat using the exploit would actually perform in that particular organization's environment.

The automated sandbox generator communicates and receives directions from the synthetic cyberattack tool 125 and the cyber security training tool 136 to guide the cyber-attack exercise on a mimic network in a cloud environment. The automated sandbox generator for a cyber-attack exercise on a mimic network in a cloud environment 60 can have various components such as the cloud enumeration component, the architecture creation component, the architecture store, the cloud deployment component, the attack engine, the monitoring component, the recording component, the user interface component, etc. The automated sandbox generator for a cyber-attack exercise on a mimic network in a cloud environment 60 can be used to create mimic networks for wargaming exercises against cyber threats exploiting vulnerabilities in the cloned network under analysis.

The automated sandbox generator for a cyber-attack exercise on a mimic network in a cloud environment 60 has multiple components.

The cloud deployment component can provide an automated solution to deploy the mimic network, which consists of a portion of 1) an information technology network, 2) a cloud network, 3) an email network, or 4) a combination of all three, in a sandbox environment in the cloud environment. The mimic network can be i) a literal clone of some subset of components from 1) the information technology network, 2) the cloud network, 3) the email network, or 4) a combination of all three that exists in an organization's environment/is implemented by the organization (e.g., cloned in the data files, software installed, version of that device, etc. and then implemented on/cloned onto a spun up virtual machine), ii) a subset of predefined example components found in common network architectures, or iii) some combination of both. The cloud deployment component is further configured to utilize a sandbox creator to create a sandbox environment in the cloud environment. (e.g., an Azure Cloud is configured to allow a user to create an Azure Sandbox environment with the following steps: Sign into the Azure Portal, click on Create a Resource on the dashboard; Select the "Sandbox" option, and then click Create to create a temporary tenant environment in the cloud provider.) The attack engine can deploy a cyber threat, from a library of selectable cyber threats, to use an exploit or a series of exploits that can be tested and interacted with, including capable of remote control over actions taken by the cyber threat, during a wargaming cyber-attack exercise in the mimic network deployed by the cloud deployment component. The attack engine can utilize automatic attack construction for the cyber threat, which can incorporate i) an importation of an output of attack path modeling from a prevent cyber-attack simulator, ii) an awareness of Attack Surface Monitoring, and iii) any combination of both, to try and establish when a customer is vulnerable to a certain exploit used by the cyber threat in the cyber-attack on the mimic network.

The monitoring component can communicate with a series of sensors deployed in the mimic network in the sandbox environment in the cloud environment. A user interface component can communicate with the monitoring component to display results of testing in the wargaming cyber-attack exercise be displayed in the user interface component mimicking at least an appearance and functionality of the user interface of a cyber security appliance 100 protecting the 1) information technology network, 2) cloud network, and/or 3) email network, that exists in the organization's environment. The monitoring component can utilize an existing set of artificial intelligence models trained on a normal pattern of life of entities in the organization's environment and its associated machine learning. The monitoring component can use different mechanisms to utilize an existing set of artificial intelligence models trained on a normal pattern of life of entities in the organization's environment and its associated machine learning such as i) making a snapshot of the state of an existing cyber security appliance 100 that is a mirror copy of the cyber security appliance 100 protecting the organization's environment, or ii) establishing a secure communications channel with an actual cyber security appliance 100 that is operating in real time to protect the organization's environment, but is made aware, such as by markers or other indicators that information being sent via the secure communications channel is coming from the wargaming cyber-attack exercise in the sandbox environment.

The user interface component can display, in real time, parameters, messages, model breaches, and other results of the wargaming cyber-attack exercise being conducted in the sandbox environment, to create a behavioral profile of how a certain cyber threat using one or more exploits would actually perform in that particular organization's environment. i) The cyber security appliance 100 protecting the organization's environment, ii) a separate recording component, or iii) a combination of both, can record the parameters, messages, model breaches, and other results of the wargaming cyber-attack exercise for later review as a wargaming cyber-attack exercise session that can be reviewed in the future. The user interface component is further configured to output specific aspects of the results of the wargaming cyber-attack exercise in a form of a printable report and/or report displayable on the display screen. The results of the wargaming cyber-attack exercise in a form of a printable report and/or displayable report can include record parameters, messages, model breaches, and other results of the wargaming cyber-attack exercise for later review. The user interface component cooperating with the attack engine can present controls and menu options to allow individual human cyber security professionals/users to interact with the cyber threat deployed by the attack engine during the cyber-attack on the mimic network in the cloud environment, as it happens in real time, during the wargaming cyber-attack exercise. The presented controls and menu options allow individual human cyber security professionals i) to attempt to mitigate the cyber-attack by the cyber threat and the exploits it is using from progressing in real time (e.g. Blue team removing or lowering privileges, etc.), and ii) conversely, to interact with the cyber threat during the cyber-attack on the mimic network in such a way to make progress on goals of the cyber-attack by augmenting and/or overriding scripted actions of the cyber threat during the cyber-attack on the mimic network.

The monitoring component is configured to utilize the existing set of artificial intelligence models trained on the normal pattern of life of the entities in the organization's environment and its associated machine learning by making a snapshot of a state of an existing cyber security appliance 100 that is a mirror copy of the cyber security appliance 100 protecting the organization's environment.

The automated sandbox generator for a cyber-attack exercise on a mimic network in a cloud environment provides the ability to test out what portions and functions of a customer's network may be migrated to the cloud and analyze what may be exploited in the cloud without having to actual have migrated to the cloud. In addition, the automated sandbox generator for a cyber-attack exercise on a mimic network in a cloud environment provides the ability to change network policies in the sandbox environment first and see the effect on the cyber threat prior to a cloud migration with the changed network policies before they are actually implemented in the actual/real customer cloud and network environment; and thus, create and then test their network policies in advance. In addition, the automated sandbox generator for a cyber-attack exercise on a mimic network in a cloud environment provides the creation of client's environments or other example environments in the sandbox environment to allow training and development of human cyber security teams, for both general security training of how cyber-attacks happen and progress as well as training on the UI component of the security devices, including the training to extend to client's environments in the cloud and network to better the human cyber security team's incidence response posture.

The automated sandbox generator for a cyber-attack exercise on a mimic network in a cloud environment creates a cloned network environment in the cloud. The architecture creation component cooperating with the cloud deployment component allows the cloned network environment to be composed/populated with i) a standardized environment of components, such as servers, load balancers, storage arrays, backup devices, domain controllers, firewalls, etc., (taken from cloud or enterprise computing), ii) derived from a known client environment (cloud or enterprise) identified by the cybersecurity system and ii) a combination of both.

Next, the cloud enumeration component analyzes an existing real network and cloud environment and tries to determine the details of the components making up that network and cloud environment. The cloud enumeration component sends metadata about all discovered assets to the architecture creation component. The cloud enumeration component receives from the UI component the choice of the customer network to be enumerated.

Next, the architecture creation component receives the metadata about all the discovered assets of a real customer network and cloud environment including all the cloud assets and network assets from the cloud enumeration component. The architecture creation component constructs an architecture by connecting known assets in the networking cloud environment of the customer and sends that architecture to the architecture store.

Next, the architecture store stores the details of the assets and network structure and then can supply those architectural details and or subsets of the architectural details of components to the cloud deployment component when the cloud deployment component is going to spin up the cloned customer environment in the cloud in the protected sandbox environment and utilize the subset of components chosen to be observed and attacked by the human cybersecurity professionals participating in this wargaming cyberattack exercise.

The architecture store can store for this customer's environment a graph database of nodes that exist within that architecture including the cloud. The architecture creation component would go and say, what each component is within that architecture and then also identify the architecture's purpose such as an email architecture. The architecture store can store relatedness information e.g., there is a subset that are all connected to one another. Based on the human cyber security professional's review of this information on the UI component and then selection of what subset of components to test, the cloud deployment component will be scripted to pull that information in, and then deploy similar entities from premade generic components in the architecture store or go off and snapshot those network and cloud component entities from the customer's environment, and deploy them literally onto the virtual machines in the sandbox full of the customer's data and software being run.

Next, the cloud deployment component is configured to dynamically generate an instance of a sandbox environment as a new tenant instance in the cloud provider and control all internet communications into and/or out of the cloned customer environment. The new tenant instance in the cloud provider is a short-lived clone sandbox that gets destroyed after the wargaming cyberattack exercise and completely separate from the private tenant instance in the cloud hosting all of the components in the automated sandbox generator for a cyber-attack exercise on a mimic network in a cloud environment 60. Thus, no chance for the instance of the cyber threat deployed by the attack engine actually harming either the components in the private tenant instance in the cloud or the components of the actual customer environment. The cloud deployment component also is configured to populate the cloned customer environment in the instance of a sandbox environment. The cloud deployment component can spin up clone assets in the sandbox environment in the cloud provider that mimics cloud and network assets chosen by the human cyber security team via any of the following two mechanisms. 1) The cloud deployment component can spin up clone assets in the sandbox environment in the cloud provider by using pre-existing library of virtual machines that emulate/simulate various cloud assets and network assets such as databases servers et cetera. 2) The cloud deployment component can also spin up clone assets in the sandbox environment in the cloud provider by taking snapshots of customers real components in their network and cloud environment. In this way when a snapshot is taken of the database or of a server, then all of the mirror image of all of the software and information on that database or on that server are imported into the virtual machine spun up in the cloud environment to replicate and/or imitate the customer cloned environment in the sandbox. The cloud deployment component can get the architectural details of the organization's real cloud and network components making up their environment from the architecture store and pulls those details in when spinning up and populating the virtual machines with that information. The cloud deployment component also receives from the UI component the choices from the so human cyber security team of what subset of the customer's network will be spun up and cloned in the customer environment in the sandbox to be tested and wargamed upon.

The human cyber security professional will typically choose a subset of components within the architectural details of the entire actual/real Customer Cloud and Network Environment cloud because of the expenses and time it takes to spin up every component within their cloud and network environment. The attack engine communicates with the prevent cyber threat attack simulator 105 and the cyber security appliance 100 to find the components with the highest risk and vulnerability scores and/or most likely attack paths in this particular network to allow the users to intelligently choose a subset of components typically including at least the cloud assets making up this particular network.

Next, the attack engine receives from the UI component the choices from the human cyber security team of what type of attack cyber-attack is going to be launched as well as other choices of design criteria of what choice is to be carried out. The attack engine is also configured to deploy (launch and release) the attack by the cyber threat on the created clone network environment. In an example, the attack engine can supply command and control information into a launched advanced, persistent threat, and how it actually migrates itself through the created clone network environment. The synthetic cyberattack tool 125 and the cyber security training tool 136 cooperate with the user interface component to record events and data in a log of attack data of how the cyber-attack is progressing on the mimic network, what components in the mimic network are being affected by the cyber threat, effects of any countermeasures used by a human cybersecurity team and any automated responses by an autonomous response module in a cyber security appliance 100 on the cyber threat that was deployed, and then the synthetic cyberattack tool 125 and the cyber security training tool 136 are configured to send out the log to the user interface component so that the human cybersecurity team can observe how the cyber-attack on the mimic network is playing out. The attack engine gives the ability to define this kind of framework via scripts and run diverse attacks on a very realistic environment (e.g., the clone is a copy of a real customer's environment in the sandbox in the cloud. The cyber threat such as an APT, Malware, Ransomware, Distributed denial of service (DDoS) attack, etc. to gain credentials or gain access to important information.

The attack engine receives from the UI component the choices from the human cyber security team to control the cyber-attack launched and then deploy whatever they want, and then see the cyber-attack launched as it progresses on exactly whatever they deployed. Each different cyber threat type has a corresponding set of scripts written from the coding of an instance of that cyber threat as well as actual reports of how that cyber threat attacked networks in the past. The attack engine has a list of scripts of different strategies and techniques to get from completely outside the network to getting inside the network. The attack engine has a list of scripts of different strategies and techniques to once inside the network proceed to a key component such as compromising and then taking over e.g., owning a domain controller, obtaining a key set of files secured on a component such as a server, etc. The attack engine will then start this attack and track its progress, and then relay that back to the user interface component, so that the human cyber security professional can see and control how far the attack has gone and what the cyber-attack is actually doing at the time. The attack engine has an input to allow human input from a human cyber security professional acting as a red team to augment and/or override the scripted techniques and actions that would be taken by a given cyber threat. The human cyber security professional can click on and/or give voice input or text input into the UI component on the selection of the particular cyber threat launched as well as the actions the particular cyber threat may take. The human cyber security professional can click controls, for example, who initiates the attack, who decides what the attack should entail, and who actually performs the attack.

The attack engine has intelligence running with algorithms and software that run operations of the attack engine in general as well as algorithms and software that automatically per a script control the cyber threat progressing through the mimic network as well as allows human input to augment and/or override actions scripted to control the cyber threat and its attack. Thus, the attack engine may be a fully automated attack that follows scripts for the cyber-attack, a fully manual attack where the human cyber security professional controls each decision for the cyber-attack, or a combination of both.

The attack engine automatically constructs a cyber threat attack and uses this clone framework. The attack engine can reference a prevent cyber-attack simulator if the client's network has one or a generic prevent cyber-attack simulator used for this automated sandbox generator for a cyber-attack exercise on a mimic network in a cloud environment 60 for details and insight on what the attack should entail, this fully automated, which is where we could use the output of the attack path modeling to decide on an approach like the best method to compromise the environment. Thus, the attack engine automatically constructs the cyber threat attack on this clone framework of the customer's environment and factors in attack paths (that are more susceptible to this form of cyber threat attack deployed) from attack path modeling specific to this particular network.

The Monitoring Component

The monitoring component can make a mirror image and then spin up clones of the cyber security appliance 100 and its machine learning models of the pattern of life of the entities (e.g., users and devices) in the network, a restoration engine, and a prevent cyber threat attack simulator that is used in the client's network, or establishes a two-way communication with the actual cyber security appliance 100 and its AI models of pattern of life of the entities and devices in the network 160, the restoration engine 190, and the prevent cyber threat attack simulator 105 that is used in the client's network themselves where the communications have a marker inserted or other indications so that the cyber security devices themselves and their machine learning understand the information from wargame engine are synthetic and will be acted upon but never factored into the machine learning utilized by cyber security devices or stored or maintained in the history of events of this customer's network. Thus, the cyber security appliance 100 will detect the actions occurring in the mimic network and indicate when these actions in the cloned network deviate from the normal behavior of entities in the real customer network.

The monitoring component monitors the mimic of the customer's network with sensors and then sends the monitoring information back out to the UI component so that the UI component can show how the attack is playing out in real time. In parallel, a recording component records all the information being obtained from the sensors going into the monitoring component as the attack is occurring in real time and the actions of the human cyber security professionals as well as the automated actions of the cybersecurity protection systems and how that is affecting the ongoing attack in the cloned customer environment in the sandbox environment. The recording component also records attack data how the attack is progressing, what components are being affected, the effects currently on the cyber threat that was introduced, etc. The attack engine records a log of attack data how the attack is progressing, what components are being affected, the effects currently on the cyber threat that was introduced which that information, and then the attack engine sends out all of this information to the UI component so that the human cybersecurity team can observe how the attack is playing out and the recording component can record all of that information in parallel so that later a review of what happened and fast forwarding and reversing of through these scenario of the attack can occur for future analysis.

The monitoring component works with sensors and other feedback components in the cloned customer environment to provide information on what the parameters and traffic and other details of what is occurring in the cloned customer environment as well as to show the attack from the cyber threat is progressing. The monitoring component works with the cloud deployment component to deploy Operating System sensors, client sensors, virtual machine sensors, etc. on the virtual machines spun up to provide information on what the parameters and traffic and other details of what is occurring in the cloned customer environment. The attack engine is in communication with the launched cyber threat and keeps a log of a progress report each time the cyber threat does something on a compromised component, the report will also indicate whether the cyber threat's action was successful or not. The human security professional can look at those logs and see what the cyber threat via the attack engine is actually doing and how it is responding to the actions taken by the humans and the rest of the cyber security devices. The monitoring component works with the UI component to display this information to human cyber security professionals as well as over to the recording component. The monitoring component also keeps track of the autonomous response engine's actions and human's actions of shutting down equipment, changing permissions, etc. actions used to counter the cyber threat during the wargaming exercise in the cloned customer environment. The UI component displays the typical information coming from the cyber security appliance 100 such as model breaches occurring, trends, AI cyber analyst write ups, autonomous response actions taken and/or recommendations from the autonomous response engine to mitigate the cyber threat, restoration actions/suggestions from the restoration engine, etc. The monitoring component can use the V-sensors and OS-sensors, as well as the existing cloud module in the cyber security appliance 100 that has AI classifiers and algorithms to evaluate data (e.g., traffic) pulled in from V-sensors and OS-sensors in a cloud network such as AWS, and then this third entity (the discrete cloud network risk score generator that can pull in network logs, etc. The system pulls in an actual enumeration of everything that exists in the cloud through this API, and then uses that information to tie back together those alerts from the SaaS module, or those alerts from the V-sensors and OS-sensors.

Inputs from the cyber security appliance 100 and autonomous response module/engine, the restoration engine, and the prevent cyber threat attack simulator to detect and respond to the cyber-attack will be fed interactively into and back out of the components populating the cloned network. (Also, see FIGS. 5 and 6) The attack engine through its scripts and capability to receive human cyber security professional inputs through the UI component to augment and/or override scripted actions contextualizes a feedback loop between the autonomous response engine's actions and human's actions of shutting down equipment, changing permissions, etc. actions used to counter the cyber threat during the wargaming exercise, the attack engine pulling that data back in and representing the end user how those actions have affected the cyber threat and its actions in the wargaming exercise. The detector of the cyber security appliance 100 monitors the unusual behavior and shows both how it manifests in the user interface component and how the pattern of life is modeled.

More Details on the Operation

The cloud enumeration component, the architecture creation component, and the architecture store cooperate to form an intelligent cloud architecture type detector. The cloud enumeration component enumerates all assets (e.g., virtual machines, databases) present in the customer cloud environment using an API-based method. All firewall and user policies are also parsed. The purpose of the product is to determine cloud security misconfigurations, to produce an understanding of enumerations of the kind of risk level in the cloud, and what assets the organization's networking environment has in the cloud. The unified system has one user interface component that features audit information from the cloud network, and sets an enumeration and kind of compliance, misconfigurations on those assets in the cloud.

The cloud enumeration component cooperating with the architecture creation component then constructs a graph where each asset appears as a node. Pseudo "VPC" nodes are seeded into the graph. The cloud architecture can consist of different asset types—x number of virtual machines, x number of compute engines, X number of Rds databases, etc.

The cloud architecture-based approach examines a particular cloud architecture, such as the Customer Cloud and Network Environment, composed of pieces of infrastructure.

The cloud enumeration component cooperating with the architecture creation component conceptualizes the infrastructure in the Customer Cloud and Network Environment to connect assets together to derive the purpose of architectures. So, an example infrastructure might include a series of databases and different types of servers that might include a load balancer and other different asset types. Note, for example, that each of the series of databases can be checked for risk misconfigurations. So individual nodes set in that architecture themselves carry risk. The architecture creation component creates a graph of each discreet cloud network (based on connectivity and group purpose of that discreet cloud network) and a risk analysis associated with that discreet cloud network.

The cloud enumeration component enumerates all assets (e.g., virtual machines, databases) present in the customer cloud environment using an API-based method. Thus, the cloud enumeration component enumerates, every asset that exists in, for example, the customer's AWS environment and every kind of user and every firewall policy, and all of this information is used to construct a graph database where every asset is a node.

The architecture creation component then constructs a graph where each asset appears as a node. Pseudo "Virtual Private Cloud (VPC)" nodes are seeded into the graph. Edges are drawn between nodes based upon features such as a parent/child relationship (EC2 is in VPC 1 which is in region A), owns/contains relationships (database A owns volume B), and traffic relationships (network policy permits traffic between two entities).

Thus, the architecture creation component connects those nodes together by a series of edges. The first kind of edge is a child parent, child relationship. So, a subnet contains Ec. 2, so that Ec2 is connected to a subnet with a parent child relationship. Another kind of edge relationship that you might have is—has or owns. So, an Ec. 2 might own a certificate. An SSL certificate which will be a separate type of asset. You also have traffic type edges. So, one instance can talk to another one because of a firewall policy.

The user interface component visualizes/presents the connected whole cloud infrastructure being analyzed. As discussed above, the architecture creation component automatically generates/creates its own diagrams, which the user/human cyber security professional can then interact with, and the user can click on individual cloud assets to find out the risk. In the architecture creation component, for serverless assets, edges are also drawn between user entities and the assets they can impact—by role permissions or by read/write permissions.

In the cloud enumeration component, a search algorithm starts from each VPC node on the resulting graph. The search algorithm can start at a top node, and then see what the search algorithm can reach with the search, and everything the search algorithm can reach is considered part of this cloud architecture under analysis and presented on the UI component. Thus, the search algorithm attempts to traverse from each VPC node to as many assets as possible—some edge types and some node types are marked as untraversable. The set of connected assets that results from this analysis are considered an "architecture"—an interconnected series of assets in the cloud that represent a discrete infrastructure or project. In an organization's overall cloud network, the cloud enumeration component and the architecture creation component cooperate to produce these sets of discrete cloud architectures, which are stored in the architecture store.

Figure 4:
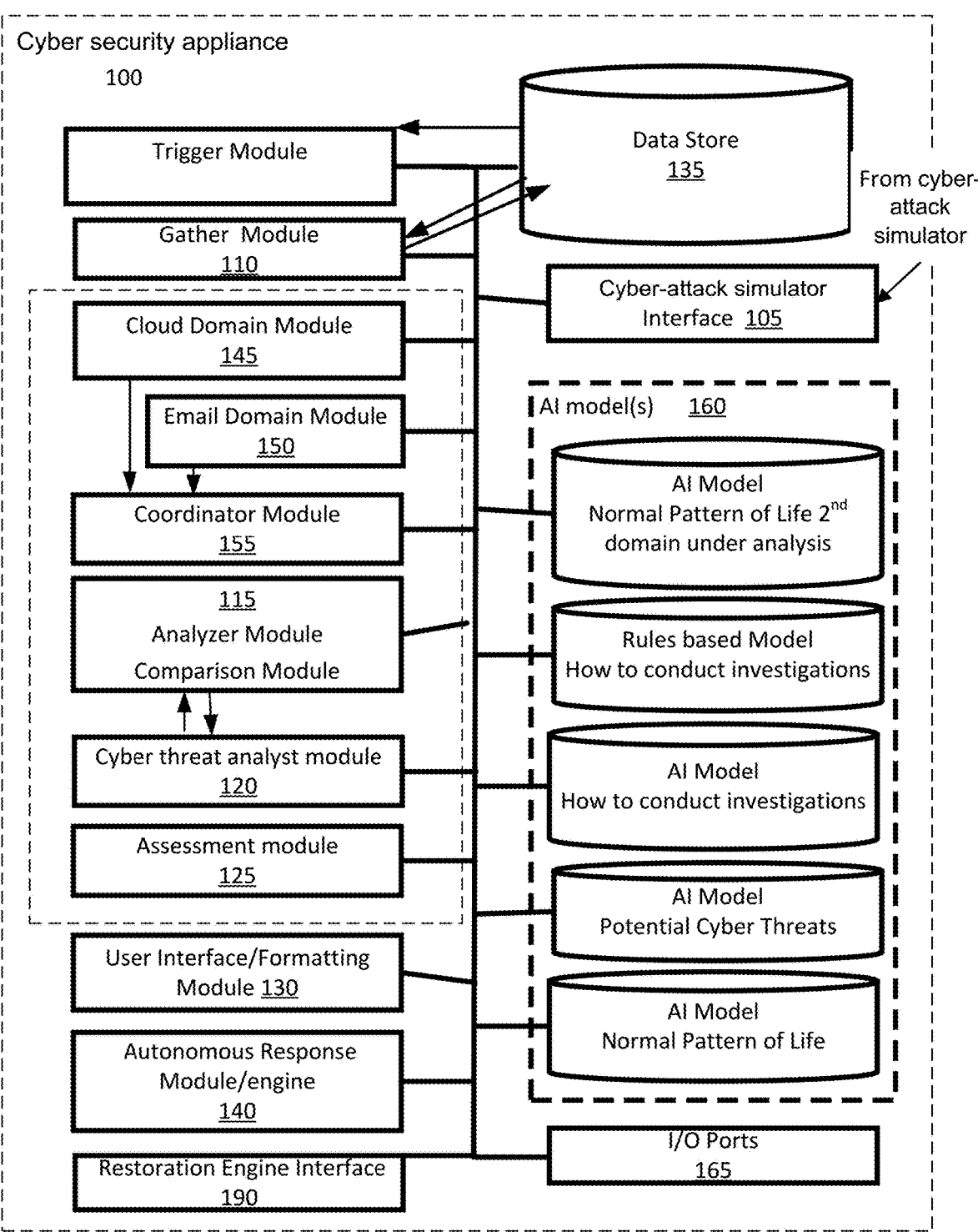
FIG. 4 illustrates a block diagram of an embodiment of the AI-based cyber security appliance with example components making up a detection engine, that cooperates with the synthetic cyberattack tool and the cyber security training tool, in order to protect a system, including but not limited to a network/domain, from cyber threats.

FIG. 4 illustrates a block diagram of an embodiment of the AI-based cyber security appliance with example components making up a detection engine, that cooperates with the synthetic cyberattack tool and the cyber security training tool, in order to protect a system, including but not limited to a network/domain, from cyber threats. Various Artificial Intelligence models and modules of the cyber security appliance 100 cooperate to protect a system, such as one or more networks/domains under analysis, from cyber threats. As shown, according to one embodiment of the disclosure, the AI-based cyber security appliance 100 may include a trigger module, a gather module 110, an analyzer module 115, a cyber threat analyst module 120, an assessment module 124, a user interface and formatting module 130, a data store 135, an autonomous response engine 140 and/or an interface to an autonomous response engine 140, a cloud module 145, an email module 150, and a coordinator module 155, one or more AI models 160 (hereinafter, AI model(s)"), and/or other modules. The AI model(s) 160 may be trained with machine learning on a normal pattern of life for entities in the network(s)/domain(s) under analysis, with machine learning on cyber threat hypotheses to form and investigate a cyber threat hypothesis on what are a possible set of cyber threats and their characteristics, symptoms, remediations, etc., and/or trained on possible cyber threats including their characteristics and symptoms, an interface to a restoration engine 190, an interface to a cyber-attack simulator 105, and other similar components.

The cyber security appliance 100 can host the cyber threat detection engine and other components. The cyber security appliance 100 includes a set of modules cooperating with one or more Artificial Intelligence models configured to perform a machine-learned task of detecting a cyber threat incident. The detection engine uses the set of modules cooperating with the one or more Artificial Intelligence models to detect anomalous behavior of one or more nodes, including at least user accounts, devices, and versions of source code files, in a graph of a system being protected. The detection engine uses the set of modules cooperating with the one or more Artificial Intelligence models in the cyber security appliance 100 to prevent a cyber threat from compromising the nodes and/or spreading through the nodes of the system.

The cyber security appliance 100 with the Artificial Intelligence (AI)-based cyber security system may protect a network/domain from a cyber threat (insider attack, malicious files, malicious emails, etc.). In an embodiment, the cyber security appliance 100 can protect all of the devices on the network(s)/domain(s) being monitored by monitoring domain activity including communications). For example, a cloud module (e.g., first domain module 145) may communicate with network sensors to monitor network traffic going to and from the computing devices on the cloud network as well as receive secure communications from software agents embedded in host computing devices/containers. The steps below will detail the activities and functions of several of the components in the cyber security appliance 100.

The gather module 110 may be configured with one or more process identifier classifiers. Each process identifier classifier may be configured to identify and track one or more processes and/or devices in the network, under analysis, making communication connections. The data store 135 cooperates with the process identifier classifier to collect and maintain historical data of processes and their connections, which is updated over time as the network is in operation. Individual processes may be present in merely one or more domains being monitored. In an example, the process identifier classifier can identify each process running on a given device along with its endpoint connections, which are stored in the data store 135. In addition, a feature classifier can examine and determine features in the data being analyzed into different categories.

Figure 7:
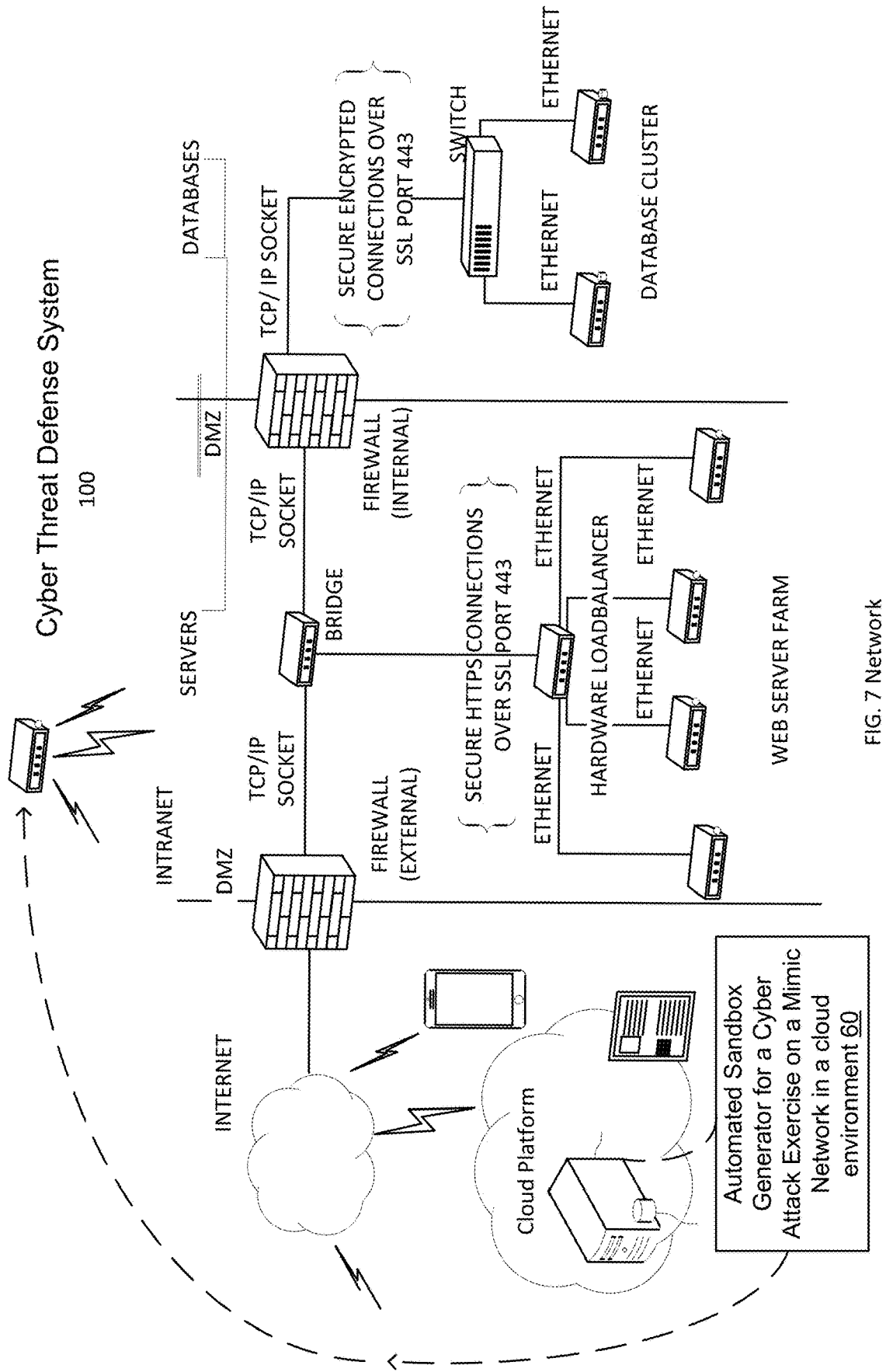
FIG. 7 illustrates a block diagram of an embodiment of the AI-based cyber security appliance with the cyber security restoration engine and other Artificial Intelligence-based engines plugging in as an appliance platform to protect a system.

The analyzer module 115 can cooperate with the AI model(s) 160 or other modules in the cyber security appliance 100 to confirm a presence of a cyberattack against one or more domains in an enterprise's system (e.g., see system/enterprise network 50 of FIG. 7). A process identifier in the analyzer module 115 can cooperate with the gather module 110 to collect any additional data and metrics to support a possible cyber threat hypothesis. Similarly, the cyber threat analyst module 120 can cooperate with the internal data sources as well as external data sources to collect data in its investigation. More specifically, the cyber threat analyst module 120 can cooperate with the other modules and the AI model(s) 160 in the cyber security appliance 100 to conduct a long-term investigation and/or a more in-depth investigation of potential and emerging cyber threats directed to one or more domains in an enterprise's system. Herein, the cyber threat analyst module 120 and/or the analyzer module 115 can also monitor for other anomalies, such as model breaches, including, for example, deviations for a normal behavior of an entity, and other techniques discussed herein. As an illustrative example, the analyzer module 115 and/or the cyber threat analyst module 120 can cooperate with the AI model(s) 160 trained on potential cyber threats in order to assist in examining and factoring these additional data points that have occurred over a given timeframe to see if a correlation exists between 1) a series of two or more anomalies occurring within that time frame and 2) possible known and unknown cyber threats. The cyber threat analyst module can cooperate with the internal data sources as well as external data sources to collect data in its investigation.

According to one embodiment of the disclosure, the cyber threat analyst module 120 allows two levels of investigations of a cyber threat that may suggest a potential impending cyberattack. In a first level of investigation, the analyzer module 115 and AI model(s) 160 can rapidly detect and then the autonomous response engine 140 will autonomously respond to overt and obvious cyberattacks. However, thousands to millions of low level anomalies occur in a domain under analysis all of the time; and thus, most other systems need to set the threshold of trying to detect a cyberattack by a cyber threat at level higher than the low level anomalies examined by the cyber threat analyst module 120 just to not have too many false positive indications of a cyberattack when one is not actually occurring, as well as to not overwhelm a human cyber security analyst receiving the alerts with so many notifications of low level anomalies that they just start tuning out those alerts. However, advanced persistent threats attempt to avoid detection by making these low-level anomalies in the system over time during their cyberattack before making their final coup de grace/ultimate mortal blow against the system (e.g., domain) being protected. The cyber threat analyst module 120 also conducts a second level of investigation over time with the assistance of the AI model(s) 160 trained with machine learning on how to form cyber threat hypotheses and how to conduct investigations for a cyber threat hypothesis that can detect these advanced persistent cyber threats actively trying to avoid detection by looking at one or more of these low-level anomalies as a part of a chain of linked information.

Figure 5:
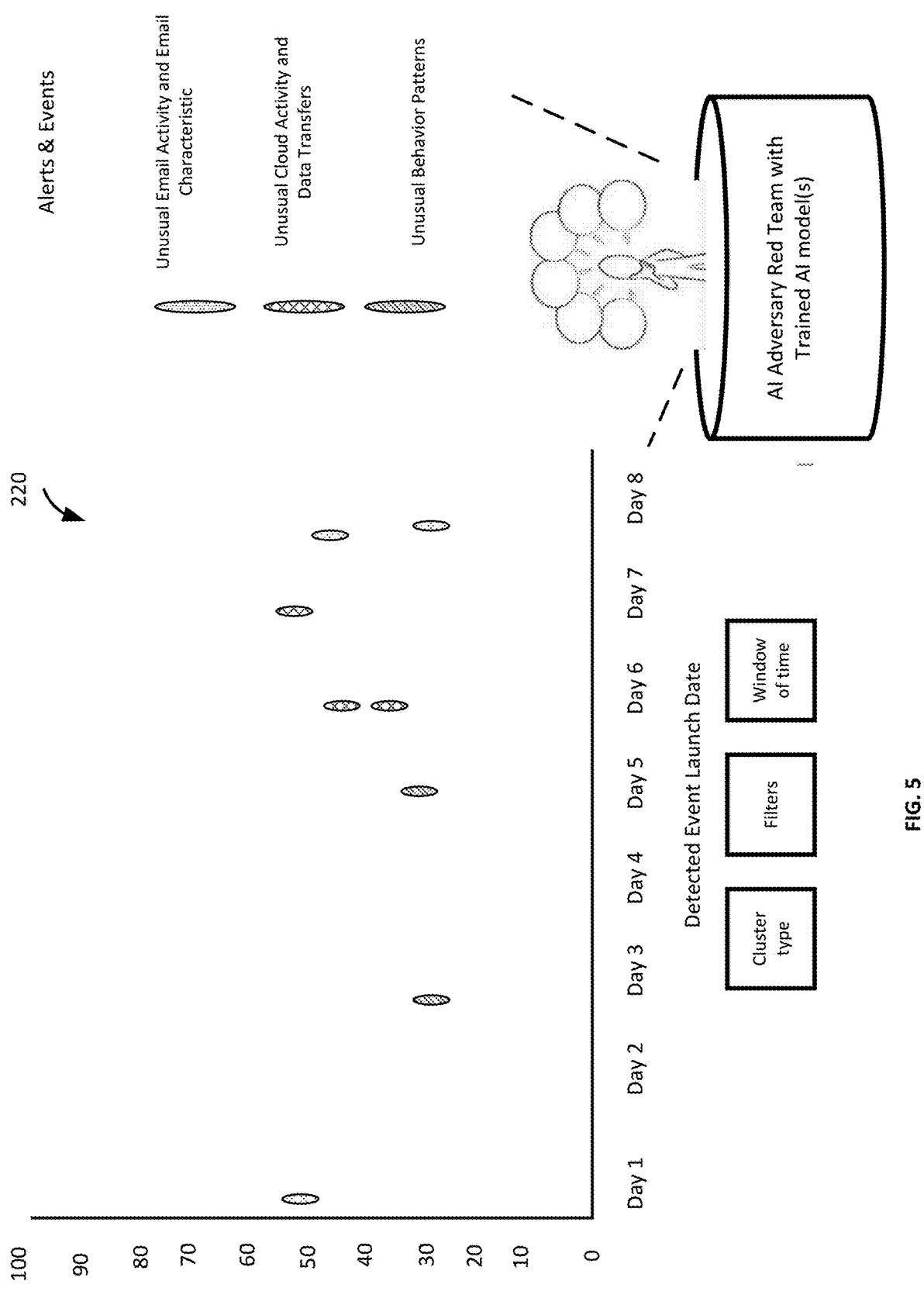
FIG. 5 illustrates a graph of an embodiment of an example chain of unusual behavior for, in this example, the email activities and Cloud network activities deviating from a normal pattern of life in connection with the rest of the system/network under analysis.

Note, a data analysis process can be algorithms/scripts written by humans to perform their function discussed herein; and can in various cases use AI classifiers as part of their operation. The cyber threat analyst module 120 forms in conjunction with the AI model(s) 160 trained with machine learning on how to form cyber threat hypotheses and how to conduct investigations for a cyber threat hypothesis investigate hypotheses on what are a possible set of cyber threats. The cyber threat analyst module 120 can also cooperate with the analyzer module 115 with its one or more data analysis processes to conduct an investigation on a possible set of cyber threats hypotheses that would include an anomaly of at least one of i) the abnormal behavior, ii) the suspicious activity, and iii) any combination of both, identified through cooperation with, for example, the AI model(s) 160 trained with machine learning on the normal pattern of life of entities in the system. For example, as shown in FIG. 5, the cyber threat analyst module 120 may perform several additional rounds 220 of gathering additional information, including abnormal behavior, over a period of time, in this example, examining data over a 7-day period to determine causal links between the information. The cyber threat analyst module 120 may submit to check and recheck various combinations/a chain of potentially related information, including abnormal behavior of a device/user account under analysis for example, until each of the one or more hypotheses on potential cyber threats are one of 1) refuted, 2) supported, or 3) included in a report that includes details of activities assessed to be relevant activities to the anomaly of interest to the user and that also conveys at least this particular hypothesis was neither supported or refuted. For this embodiment, a human cyber security analyst is needed to further investigate the anomaly (and/or anomalies) of interest included in the chain of potentially related information.

Returning back to FIG. 4, an input from the cyber threat analyst module 120 of a supported hypothesis of a potential cyber threat will trigger the analyzer module 115 to compare, confirm, and send a signal to act upon and mitigate that cyber threat. In contrast, the cyber threat analyst module 120 investigates subtle indicators and/or initially seemingly isolated unusual or suspicious activity such as a worker is logging in after their normal working hours or a simple system misconfiguration has occurred. Most of the investigations conducted by the cyber threat analyst module 120 cooperating with the AI model(s) 160 trained with machine learning on how to form cyber threat hypotheses and how to conduct investigations for a cyber threat hypothesis on unusual or suspicious activities/behavior may not result in a cyber threat hypothesis that is supported but rather most are refuted or simply not supported. Typically, during the investigations, several rounds of data gathering to support or refute the long list of potential cyber threat hypotheses formed by the cyber threat analyst module 120 will occur before the algorithms in the cyber threat analyst module 120 will determine whether a particular cyber threat hypothesis is supported, refuted, or needs further investigation by a human. The rounds of data gathering may build chains of linked low-level indicators of unusual activity along with potential activities that could be within a normal pattern of life for that entity to evaluate the whole chain of activities to support or refute each potential cyber threat hypothesis formed. (See again, for example, FIG. 5 and a chain of linked low-level indicators, including abnormal behavior compared to the normal pattern of life for that entity, all under a score of 50 on a threat indicator score). The investigations by the cyber threat analyst module 120 can happen over a relatively long period of time and be far more in depth than the analyzer module 115 which will work with the other modules and AI model(s) 160 to confirm that a cyber threat has in fact been detected.

The gather module 110 may further extract data from the data store 135 at the request of the cyber threat analyst module 120 and/or analyzer module 115 on each possible hypothetical threat that would include the abnormal behavior or suspicious activity and then can assist to filter that collection of data down to relevant points of data to either 1) support or 2) refute each particular hypothesis of what the cyber threat, the suspicious activity and/or abnormal behavior relates to. The gather module 110 cooperates with the cyber threat analyst module 120 and/or analyzer module 115 to collect data to support or to refute each of the one or more possible cyber threat hypotheses that could include this abnormal behavior or suspicious activity by cooperating with one or more of the cyber threat hypotheses mechanisms to form and investigate hypotheses on what are a possible set of cyber threats.

Thus, the cyber threat analyst module 120 is configured to cooperate with the AI model(s) 160 trained with machine learning on how to form cyber threat hypotheses and how to conduct investigations for a cyber threat hypothesis to form and investigate hypotheses on what are a possible set of cyber threats and then can cooperate with the analyzer module 115 with the one or more data analysis processes to confirm the results of the investigation on the possible set of cyber threats hypotheses that would include the at least one of i) the abnormal behavior, ii) the suspicious activity, and iii) any combination of both, identified through cooperation with the AI model(s) 160 trained with machine learning on the normal pattern of life/normal behavior of entities in the domains under analysis.

Note, in the first level of threat detection, the gather module 110 and the analyzer module 115 cooperate to supply any data and/or metrics requested by the analyzer module 115 cooperating with the AI model(s) 160 trained on possible cyber threats to support or rebut each possible type of cyber threat. Again, the analyzer module 115 can cooperate with the AI model(s) 160 and/or other modules to rapidly detect and then cooperate with the autonomous response engine 140 to autonomously respond to overt and obvious cyberattacks, (including ones found to be supported by the cyber threat analyst module 120).

As a starting point, the AI-based cyber security appliance 100 can use multiple modules, each capable of identifying abnormal behavior and/or suspicious activity against the AI model(s) 160 trained on a normal pattern of life for the entities in the network/domain under analysis, which is supplied to the analyzer module 115 and/or the cyber threat analyst module 120. The analyzer module 115 and/or the cyber threat analyst module 120 may also receive other inputs such as AI model breaches, AI classifier breaches, etc. a trigger to start an investigation from an external source.

Many other model breaches of the AI model(s) 160 trained with machine learning on the normal behavior of the system can send an input into the cyber threat analyst module 120 and/or the trigger module to trigger an investigation to start the formation of one or more hypotheses on what are a possible set of cyber threats that could include the initially identified abnormal behavior and/or suspicious activity. Note, a deeper analysis can look at example factors such as i) how long has the endpoint existed or is registered; ii) what kind of certificate is the communication using; iii) is the endpoint on a known good domain or known bad domain or an unknown domain, and if unknown what other information exists such as registrant's name and/or country; iv) how rare; v), etc.

Note, the cyber threat analyst module 120 cooperating with the AI model(s) 160 trained with machine learning on how to form cyber threat hypotheses and how to conduct investigations for a cyber threat hypothesis in the AI-based cyber security appliance 100 provides an advantage as it reduces the time taken for human led or cyber security investigations, provides an alternative to manpower for small organizations and improves detection (and remediation) capabilities within the cyber security appliance 100.

The cyber threat analyst module 120, which forms and investigates hypotheses on what are the possible set of cyber threats, can use hypotheses mechanisms including any of 1) one or more of the AI model(s) 160 trained on how human cyber security analysts form cyber threat hypotheses and how to conduct investigations for a cyber threat hypothesis that would include at least an anomaly of interest, 2) one or more scripts outlining how to conduct an investigation on a possible set of cyber threats hypotheses that would include at least the anomaly of interest, 3) one or more rules-based models on how to conduct an investigation on a possible set of cyber threats hypotheses and how to form a possible set of cyber threats hypotheses that would include at least the anomaly of interest, and 4) any combination of these. Again, the AI model(s) 160 trained on 'how to form cyber threat hypotheses and how to conduct investigations for a cyber threat hypothesis' may use supervised machine learning on human-led cyber threat investigations and then steps, data, metrics, and metadata on how to support or to refute a plurality of the possible cyber threat hypotheses, and then the scripts and rules-based models will include the steps, data, metrics, and metadata on how to support or to refute the plurality of the possible cyber threat hypotheses. The cyber threat analyst module 120 and/or the analyzer module 115 can feed the cyber threat details to the assessment module 124 to generate a threat risk score that indicate a level of severity of the cyber threat.

The multiple Artificial Intelligence-based engines each have an interface to communicate with the other separate Artificial Intelligence-based engines. Each Intelligence-based engine has an interface to communicate with another separate Artificial Intelligence-based engine, which is configured to understand a type of information and communication that this other separate Artificial Intelligence-based engine needs to make determinations on an ongoing cyber-attack from that other Artificial Intelligence-based engine's perspective. The autonomous response engine 140 works with the assessment module in the detection engine when the cyber threat is detected and autonomously takes one or more actions to mitigate the cyber threat. FIG. 4 shows the example components making up the detection engine to include interfaces to the cyber-attack simulator, the autonomous response engine 140, and the restoration engine.

The cyber threat detection engine can also have an anomaly alert system in a formatting module configured to report out anomalous incidents and events as well as the cyber threat detected to a display screen viewable by a human cyber-security professional. Each Artificial Intelligence-based engine has a rapid messaging system to communicate with a human cyber-security team to keep the human cyber-security team informed on actions autonomously taken and actions needing human approval to be taken.

Referring to FIG. 2, the cyber security restoration engine 190 is configured to take one or more remediation actions based on configured and/or Artificial Intelligence assistance to remediate the one or more nodes in the graph of the system being protected back to a trusted operational state in a recovery from the cyber threat. These actions might be fully automatic, or require a specific human confirmation decision before they begin. The cyber security restoration engine 190 is configured to cooperate with the other AI-based engines of the cyber security system, via the interfaces and/or direct integrations, to track and understand the cyber threat identified by the other components as well as track the one or more mitigation actions taken to mitigate the cyber threat during the cyberattack by the other components in order to assist in intelligently restoring the protected system while still mitigating the cyber threat attack back to a trusted operational state; and thus, as a situation develops with an ongoing cyberattack, the cyber security restoration engine 190 is configured to take one or more remediation actions to remediate (e.g. restore) at least one of the nodes in the graph of the protected system back to a trusted operational state while the cyberattack is still ongoing.

The example multiple Artificial Intelligence-based engines cooperating with each other can include i) the cyber threat detection engine, ii) an autonomous response engine 140, iii) a cyber-security restoration engine 190, and iv) a cyber-attack simulator. i) The cyber threat detection engine (consisting of the modules making up the cyber security appliance 100) can be configured to use Artificial Intelligence algorithms trained to perform a machine-learned task of detecting the cyber threat. (See for example FIG. 4) ii) The autonomous response engine 140 can be configured to use Artificial Intelligence algorithms trained to perform a machine-learned task of taking one or more mitigation actions to mitigate the cyber threat. iii) The cyber-security restoration engine 190 can be configured to use Artificial Intelligence algorithms trained to perform a machine-learned task of remediating the system being protected back to a trusted operational state. iv) The cyber-attack simulator can be configured to use Artificial Intelligence algorithms trained to perform a machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack. (See, for example, FIG. 1)

The multiple Artificial Intelligence-based engines have communication hooks in between them to exchange a significant amount of behavioral metrics including data between the multiple Artificial Intelligence-based engines to work in together to provide an overall cyber threat response.

The intelligent orchestration component can be configured as a discreet intelligent orchestration component that exists on top of the multiple Artificial Intelligence-based engines to orchestrate the overall cyber threat response and an interaction between the multiple Artificial Intelligence-based engines, each configured to perform its own machine-learned task. Alternatively, the intelligent orchestration component can be configured as a distributed collaboration with a portion of the intelligent orchestration component implemented in each of the multiple Artificial Intelligence-based engines to orchestrate the overall cyber threat response and an interaction between the multiple Artificial Intelligence-based engines. In an embodiment, whether implemented as a distributed portion on each AI engine or a discrete AI engine itself, the intelligent orchestration component can use self-learning algorithms to learn how to best assist the orchestration of the interaction between itself and the other AI engines, which also implement self-learning algorithms themselves to perform their individual machine-learned tasks better.

The multiple Artificial Intelligence-based engines can be configured to cooperate to combine an understanding of normal operations of the nodes, an understanding emerging cyber threats, an ability to contain those emerging cyber threats, and a restoration of the nodes of the system to heal the system with an adaptive feedback between the multiple Artificial Intelligence-based engines in light of simulations of the cyberattack to predict what might occur in the nodes in the system based on the progression of the attack so far, mitigation actions taken to contain those emerging cyber threats and remediation actions taken to heal the nodes using the simulated cyberattack information.

One or more Artificial Intelligence models in the detection engine can be configured to maintain what is considered to be normal behavior for that node, which is constructed on a per node basis, on the system being protected from historical data of that specific node over an operation of the system being protected.

The multiple Artificial Intelligence-based engines each have an interface to communicate with the other separate Artificial Intelligence-based engines configured to understand a type of information and communication that the other separate Artificial Intelligence-based engine needs to make determinations on an ongoing cyberattack from that other Artificial Intelligence-based engine's perspective. Each Artificial Intelligence-based engine has an instant messaging system to communicate with a human cyber-security team to keep the human cyber-security team informed on actions autonomously taken and actions needing human approval as well as generate reports for the human cyber-security team.

FIG. 2 illustrates a diagram of an embodiment of i) the cyber threat detection engine using Artificial Intelligence algorithms trained to perform a first machine-learned task of detecting the cyber threat, ii) an autonomous response engine 140 using Artificial Intelligence algorithms trained to perform a second machine-learned task of taking one or more mitigation actions to mitigate the cyber threat, iii) a cyber-security restoration engine 190 using Artificial Intelligence algorithms trained to perform a third machine-learned task of remediating the system being protected back to a trusted operational state, and iv) a cyber-attack simulator using Artificial Intelligence algorithms trained to perform a fourth machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack, in order for these four Artificial Intelligence-based engines to work together. In addition, the intelligent orchestration component can use Artificial Intelligence algorithms trained to perform a fifth machine-learned task of adaptive interactive response between the multiple Artificial Intelligence-based engines to provide information each Artificial Intelligence engine needs to work cohesively to provide an overall incidence response that mitigates different types of cyber threats while still minimizing an impact tailored to this particular system being protected. For example, when a conversation occurs between the AI-based engines such as a system that can be positively affected by both proposed mitigation actions and proposed restoration actions, any of which might be attempted but fail or only partially succeed, then the intelligent orchestration component can arbitrate and evolve the best result for this particular system being protected. The intelligent orchestration component can help anticipate i) the needs of and ii) cohesive response of each Artificial Intelligence-based engine based on a current detected cyber threat.

The cyber-security restoration engine 190 receives and sends inputs through communication hooks (e.g.) interfaces to all of these Artificial Intelligence-based engines each configured with self-learning AI machine learning algorithms to, respectively, i) to detect the cyber threat, ii) to respond to mitigate that cyber threat, and iii) to predict how that cyber threat might occur and likely progress through simulations. Each of these Artificial Intelligence-based engines has bi-directional communications, including the exchange of raw data, with each other as well as with software agents resident in physical and/or virtual devices making up the system being protected as well as bi-directional communications with sensors within the system being protected. Note, the system under protection can be, for example, an IT network, an OT network, a Cloud network, an email network, a source code database, an endpoint device, etc.

In an example, the autonomous response engine 140 uses its intelligence to cooperate with a cyber-attack simulator and its Artificial Intelligence-based simulations to choose and initiate an initial set of one or more mitigation actions indicated as a preferred targeted initial response to the detected cyber threat by autonomously initiating those mitigation actions to defend against the detected cyber threat, rather than a human taking an action. The autonomous response engine 140, rather than the human taking the action, is configured to autonomously cause the one or more mitigation actions to be taken to contain the cyber threat when a threat risk parameter from an assessment module in the detection engine is equal to or above an actionable threshold. Example mitigation actions can include 1) the autonomous response engine 140 monitoring and sending signals to a potentially compromised node to restrict communications of the potentially compromised node to merely normal recipients and types of communications according to the Artificial Intelligence model trained to model the normal pattern of life for each node in the protected system, 2) the autonomous response engine 140 trained on how to isolate a compromised node as well as to take mitigation acts with other nodes that have a direct nexus to the compromised node.

In another example, the cyber-attack simulator and its Artificial Intelligence-based simulations use intelligence to cooperate with the cyber-security restoration engine 190 to assist in choosing one or more remediation actions to perform on nodes affected by the cyberattack back to a trusted operational state while still mitigating the cyber threat during an ongoing cyberattack based on effects determined through the simulation of possible remediation actions to perform and their effects on the nodes making up the system being protected and preempt possible escalations of the cyberattack while restoring one or more nodes back to a trusted operational state.

In another example, the cyber security restoration engine 190 restores the one or more nodes in the protected system by cooperating with at least two or more of 1) an Artificial Intelligence model trained to model a normal pattern of life for each node in the protected system, 2) an Artificial Intelligence model trained on what are a possible set of cyber threats and their characteristics and symptoms to identify the cyber threat (e.g. malicious actor/device/file) that is causing a particular node to behave abnormally (e.g. malicious behavior) and fall outside of that node's normal pattern of life, and 3) the autonomous response engine 140.

FIG. 1 illustrates a block diagram of an embodiment of the cyber-attack simulator with Artificial Intelligence-based simulations conducted in the cyber-attack simulator by constructing a graph of nodes of the system being protected (e.g. a network including i) the physical devices connecting to the network, any virtualized instances of the network, user accounts in the network, email accounts in the network, etc. as well as ii) connections and pathways through the network) to create a virtualized instance of the network to be tested. As shown in FIG. 1, the various cooperating modules residing in the cyber-attack simulator 105 may include, but are not limited to, a collections module 705, a cyberattack generator (e.g. phishing email generator with a paraphrasing engine) 702, an email module 715, a network module 720, an analyzer module 725, a payloads module 730 with first and second payloads, a communication module 735, a training module 740, a simulated attack module 750, a cleanup module 755, a scenario module 760, a user interface 765, a reporting module, a formatting module, an orchestration module, an AI classifier with a list of specified classifiers.

The cyber-attack simulator 105 may be implemented via i) a simulator to model the system being protected and/or ii) a clone creator to spin up a virtual network and create a virtual clone of the system being protected configured to pentest one or more defenses provided by scores based on both the level of confidence that the cyber threat is a viable threat and the severity of the cyber threat (e.g., attack type where ransomware attacks has greater severity than phishing attack; degree of infection; computing devices likely to be targeted, etc.). The threat risk scores be used to rank alerts that may be directed to enterprise or computing device administrators. This risk assessment and ranking is conducted to avoid frequent "false positive" alerts that diminish the degree of reliance/confidence on the cyber security appliance 100. The cyber-attack simulator 105 may include and cooperate with one or more AI models trained with machine learning on the contextual knowledge of the organization. These trained AI models may be configured to identify data points from the contextual knowledge of the organization and its entities, which may include, but is not limited to, language-based data, email/network connectivity and behavior pattern data, and/or historic knowledgebase data. The cyber-attack simulator 105 may use the trained AI models to cooperate with one or more AI classifier(s) by producing a list of specific organization-based classifiers for the AI classifier. The cyber-attack simulator 105 is further configured to calculate, based at least in part on the results of the one or more hypothetical simulations of a possible cyberattack and/or of an actual ongoing cyberattack from a cyber threat determine a risk score for each node (e.g. each device, user account, etc.), the threat risk score being indicative of a possible severity of the compromise prior to an autonomous response action is taken in response to the actual cyberattack of the cyber incident.

Figure 6:
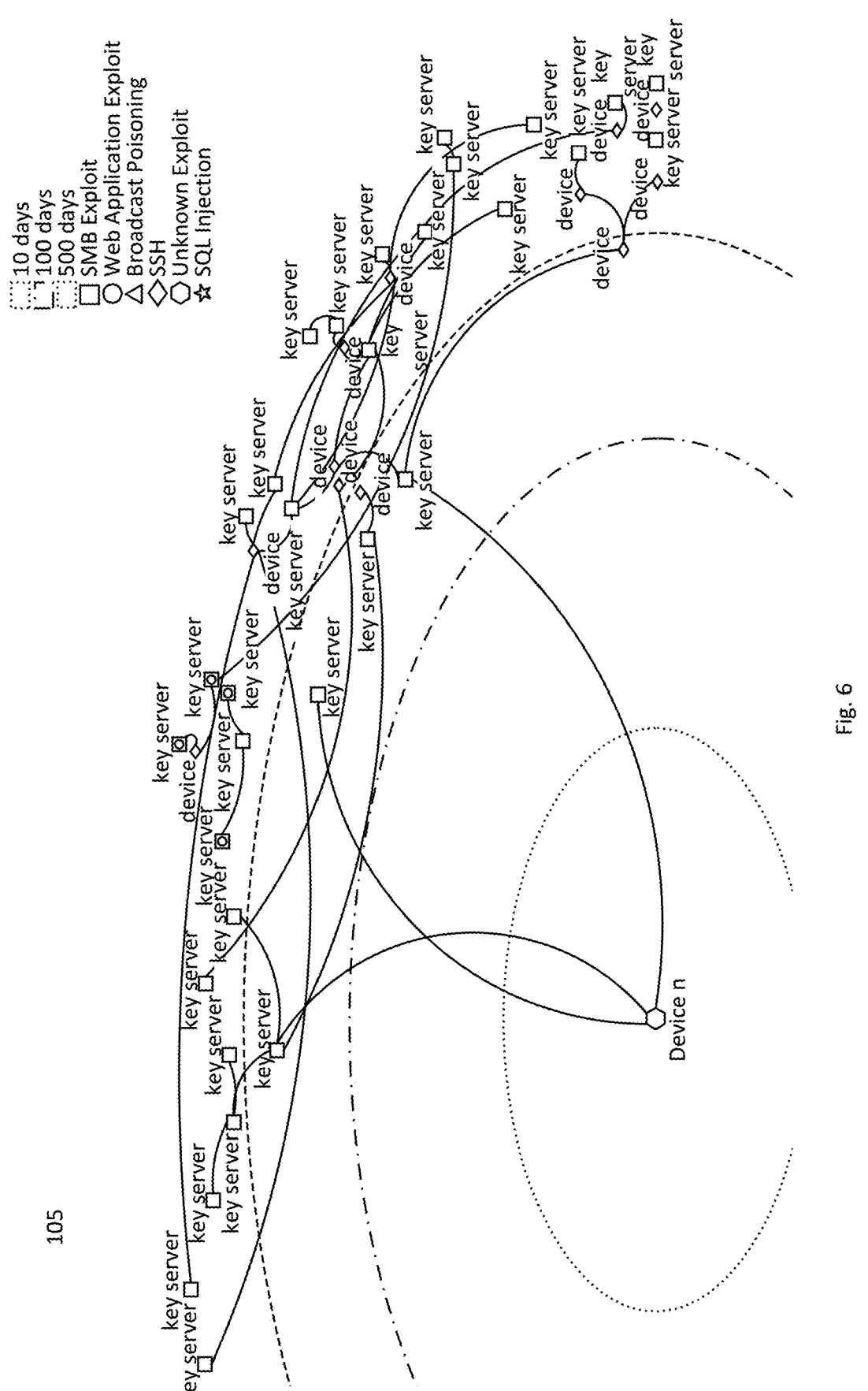
FIG. 6 illustrates a diagram of an embodiment of the cyber-attack simulator and its Artificial Intelligence-based simulations constructing an example graph of nodes in an example network and simulating how the cyberattack might likely progress in the future tailored with an innate understanding of a normal behavior of the nodes in the system being protected and a current operational state of each node in the graph of the protected system during simulations of cyberattacks.

FIG. 6 illustrates a diagram of an embodiment of the cyber-attack simulator and its Artificial Intelligence-based simulations constructing an example graph of nodes in an example network and simulating how the cyberattack might likely progress in the future tailored with an innate understanding of a normal behavior of the nodes in the system being protected and a current operational state of each node in the graph of the protected system during simulations of cyberattacks. The cyber-attack simulator 105 plots the attack path through the nodes and estimated times to reach critical nodes in the network. The cyberattack simulation modeling is run to identify the routes, difficulty, and time periods from certain entry notes to certain key servers.

Again, similarly named components in each Artificial Intelligence-based engine can 1) perform similar functions and/or 2) have a communication link from that component located in one of the Artificial Intelligence-based engines and then information is needed from that component is communicated to another Artificial Intelligence-based engine that through the interface to that Artificial Intelligence-based engine.

Training of AI Pre-Deployment and then During Deployment

In step 1, an initial training of the Artificial Intelligence model trained on cyber threats can occur using unsupervised learning and/or supervised learning on characteristics and attributes of known potential cyber threats including malware, insider threats, and other kinds of cyber threats that can occur within that domain. Each Artificial Intelligence can be programmed and configured with the background information to understand and handle particulars, including different types of data, protocols used, types of devices, user accounts, etc. of the system being protected. The Artificial Intelligence pre-deployment can all be trained on the specific machine learning task that they will perform when put into deployment. For example, the AI model, such as AI model(s) 160 or example (hereinafter "AI model(s) 160"), trained on identifying a specific cyber threat learns at least both in the pre-deployment training i) the characteristics and attributes of known potential cyber threats as well as ii) a set of characteristics and attributes of each category of potential cyber threats and their weights assigned on how indicative certain characteristics and attributes correlate to potential cyber threats of that category of threats. In this example, one of the AI models 160 trained on identifying a specific cyber threat can be trained with machine learning such as Linear Regression, Regression Trees, Non-Linear Regression, Bayesian Linear Regression, Deep learning, etc. to learn and understand the characteristics and attributes in that category of cyber threats. Later, when in deployment in a domain/ network being protected by the cyber security appliance 100, the AI model trained on cyber threats can determine whether a potentially unknown threat has been detected via a number of techniques including an overlap of some of the same characteristics and attributes in that category of cyber threats. The AI model may use unsupervised learning when deployed to better learn newer and updated characteristics of cyberattacks.

In an embodiment, one or more of the AI models 160 may be trained on a normal pattern of life of entities in the system are self-learning AI model using unsupervised machine learning and machine learning algorithms to analyze patterns and 'learn' what is the 'normal behavior' of the network by analyzing data on the activity on, for example, the network level, at the device level, and at the employee level. The self-learning AI model using unsupervised machine learning understands the system under analysis' normal patterns of life in, for example, a week of being deployed on that system, and grows more bespoke with every passing minute. The AI unsupervised learning model learns patterns from the features in the day-to-day dataset and detecting abnormal data which would not have fallen into the category (cluster) of normal behavior. The self-learning AI model using unsupervised machine learning can simply be placed into an observation mode for an initial week or two when first deployed on a network/domain in order to establish an initial normal behavior for entities in the network/domain under analysis.

Thus, a deployed Artificial Intelligence model 160 trained on a normal behavior of entities in the system can be configured to observe the nodes in the system being protected. Training on a normal behavior of entities in the system can occur while monitoring for the first week or two until enough data has been observed to establish a statistically reliable set of normal operations for each node (e.g., user account, device, etc.). Initial training of one or more Artificial Intelligence models 160 trained with machine learning on a normal behavior of the pattern of life of the entities in the network/domain can occur where each type of network and/or domain will generally have some common typical behavior with each model trained specifically to understand components/devices, protocols, activity level, etc. to that type of network/system/domain. Alternatively, pre-deployment machine learning training of one or more Artificial Intelligence models trained on a normal pattern of life of entities in the system can occur. Initial training of one or more Artificial Intelligence models trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. What is normal behavior of each entity within that system can be established either prior to deployment and then adjusted during deployment or alternatively the model can simply be placed into an observation mode for an initial week or two when first deployed on a network/domain in order to establish an initial normal behavior for entities in the network/domain under analysis. During deployment, what is considered normal behavior will change as each different entity's behavior changes and will be reflected through the use of unsupervised learning in the model such as various Bayesian techniques, clustering, etc. The AI models 160 can be implemented with various mechanisms such neural networks, decision trees, etc. and combinations of these. Likewise, one or more supervised machine learning AI models 160 may be trained to create possible hypotheses and perform cyber threat investigations on agnostic examples of past historical incidents of detecting a multitude of possible types of cyber threat hypotheses previously analyzed by human cyber security analyst. More on the training of AI models 160 are trained to create one or more possible hypotheses and perform cyber threat investigations will be discussed later.

At its core, the self-learning AI models 160 that model the normal behavior (e.g. a normal pattern of life) of entities in the network mathematically characterizes what constitutes 'normal' behavior, based on the analysis of a large number of different measures of a device's network behavior— packet traffic and network activity/processes including server access, data volumes, timings of events, credential use, connection type, volume, and directionality of, for example, uploads/downloads into the network, file type, packet intention, admin activity, resource and information requests, command sent, etc.

Clustering Methods

In order to model what should be considered as normal for a device or cloud container, its behavior can be analyzed in the context of other similar entities on the network. The AI models (e.g., AI model(s) 160) can use unsupervised machine learning to algorithmically identify significant groupings, a task which is virtually impossible to do manually. To create a holistic image of the relationships within the network, the AI models and AI classifiers employ a number of different clustering methods, including matrix-based clustering, density-based clustering, and hierarchical clustering techniques. The resulting clusters can then be used, for example, to inform the modeling of the normative behaviors and/or similar groupings.

The AI models and AI classifiers can employ a large-scale computational approach to understand sparse structure in models of network connectivity based on applying L1-regularization techniques (the lasso method). This allows the artificial intelligence to discover true associations between different elements of a network which can be cast as efficiently solvable convex optimization problems and yield parsimonious models. Various mathematical approaches assist.

Next, one or more supervised machine learning AI models are trained to create possible hypotheses and how to perform cyber threat investigations on agnostic examples of past historical incidents of detecting a multitude of possible types of cyber threat hypotheses previously analyzed by human cyber threat analysis. AI models trained on forming and investigating hypotheses on what are a possible set of cyber threats can be trained initially with supervised learning. Thus, these AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful. More on the training of the AI models that are trained to create one or more possible hypotheses and perform cyber threat investigations will be discussed later.

Next, the various Artificial Intelligence models and AI classifiers combine use of unsupervised and supervised machine learning to learn 'on the job'—it does not depend upon solely knowledge of previous cyber threat attacks. The Artificial Intelligence models and classifiers combine use of unsupervised and supervised machine learning constantly revises assumptions about behavior, using probabilistic mathematics, that is always up to date on what a current normal behavior is, and not solely reliant on human input. The Artificial Intelligence models and classifiers combine use of unsupervised and supervised machine learning on cyber security is capable of seeing hitherto undiscovered cyber events, from a variety of threat sources, which would otherwise have gone unnoticed.

Next, these cyber threats can include, for example: Insider threat—malicious or accidental, Zero-day attacks—previously unseen, novel exploits, latent vulnerabilities, machine-speed attacks—ransomware and other automated attacks that propagate and/or mutate very quickly, Cloud and SaaS-based attacks, other silent and stealthy attacks advance persistent threats, advanced spear-phishing, etc.

Ranking the Cyber Threat

The assessment module 124 and/or cyber threat analyst module 120 of FIG. 4 can cooperate with the AI model(s) 160 trained on possible cyber threats to use AI algorithms to account for ambiguities by distinguishing between the subtly differing levels of evidence that characterize network data. Instead of generating the simple binary outputs 'malicious' or 'benign', the AI's mathematical algorithms produce outputs marked with differing degrees of potential threat. This enables users of the system to rank alerts and notifications to the enterprise security administrator in a rigorous manner, and prioritize those which most urgently require action. Meanwhile, it also assists to avoid the problem of numerous false positives associated with simply a rule-based approach.

More on the Operation of the Cyber Security Appliance 100

As discussed in more detail below, the analyzer module 115 and/or cyber threat analyst module 120 can cooperate with the one or more unsupervised AI (machine learning) model 160 trained on the normal pattern of life/normal behavior in order to perform anomaly detection against the actual normal pattern of life for that system to determine whether an anomaly (e.g., the identified abnormal behavior and/or suspicious activity) is malicious or benign. In the operation of the cyber security appliance 100, the emerging cyber threat can be previously unknown, but the emerging threat landscape data 170 representative of the emerging cyber threat shares enough (or does not share enough) in common with the traits from the AI models 160 trained on cyber threats to now be identified as malicious or benign. Note, if later confirmed as malicious, then the AI models 160 trained with machine learning on possible cyber threats can update their training. Likewise, as the cyber security appliance 100 continues to operate, then the one or more AI models trained on a normal pattern of life for each of the entities in the system can be updated and trained with unsupervised machine learning algorithms. The analyzer module 115 can use any number of data analysis processes (discussed more in detail below and including the agent analyzer data analysis process here) to help obtain system data points so that this data can be fed and compared to the one or more AI models trained on a normal pattern of life, as well as the one or more machine learning models trained on potential cyber threats, as well as create and store data points with the connection finger prints.

All of the above AI models 160 can continually learn and train with unsupervised machine learning algorithms on an ongoing basis when deployed in their system that the cyber security appliance 100 is protecting. Thus, learning and training on what is normal behavior for each user, each device, and the system overall and lowering a threshold of what is an anomaly.

Anomaly Detection/Deviations

Anomaly detection can discover unusual data points in your dataset. Anomaly can be a synonym for the word 'outlier'. Anomaly detection (or outlier detection) is the identification of rare items, events or observations which raise suspicions by differing significantly from the majority of the data. Anomalous activities can be linked to some kind of problems or rare events. Since there are tons of ways to induce a particular cyber-attack, it is very difficult to have information about all these attacks beforehand in a dataset. But, since the majority of the user activity and device activity in the system under analysis is normal, the system overtime captures almost all of the ways which indicate normal behavior. And from the inclusion-exclusion principle, if an activity under scrutiny does not give indications of normal activity, the self-learning AI model using unsupervised machine learning can predict with high confidence that the given activity is anomalous. The AI unsupervised learning model learns patterns from the features in the day to day dataset and detecting abnormal data which would not have fallen into the category (cluster) of normal behavior. The goal of the anomaly detection algorithm through the data fed to it is to learn the patterns of a normal activity so that when an anomalous activity occurs, the modules can flag the anomalies through the inclusion-exclusion principle. The goal of the anomaly detection algorithm through the data fed to it is to learn the patterns of a normal activity so that when an anomalous activity occurs, the modules can flag the anomalies through the inclusion-exclusion principle. The cyber threat module can perform its two level analysis on anomalous behavior and determine correlations.

In an example, 95% of data in a normal distribution lies within two standard-deviations from the mean. Since the likelihood of anomalies in general is very low, the modules cooperating with the AI model of normal behavior can say with high confidence that data points spread near the mean value are non-anomalous. And since the probability distribution values between mean and two standard-deviations are large enough, the modules cooperating with the AI model of normal behavior can set a value in this example range as a threshold (a parameter that can be tuned over time through the self-learning), where feature values with probability larger than this threshold indicate that the given feature's values are non-anomalous, otherwise it's anomalous. Note, this anomaly detection can determine that a data point is anomalous/non-anomalous on the basis of a particular feature. In reality, the cyber security appliance 100 should not flag a data point as an anomaly based on a single feature. Merely, when a combination of all the probability values for all features for a given data point is calculated can the modules cooperating with the AI model of normal behavior can say with high confidence whether a data point is an anomaly or not. Anomaly detection can discover unusual data points in your dataset. Anomaly can be sometimes a synonym for the word 'outlier'.

Again, the AI models trained on a normal pattern of life of entities in a network (e.g., domain) under analysis may perform the cyber threat detection through a probabilistic change in a normal behavior through the application of, for example, an unsupervised Bayesian mathematical model to detect the behavioral change in computers and computer networks. The Bayesian probabilistic approach can determine periodicity in multiple time series data and identify changes across single and multiple time series data for the purpose of anomalous behavior detection. Please reference U.S. Pat. No. 10,701,093 granted Jun. 30, 2020, titled "Anomaly alert system for cyber threat detection" for an example Bayesian probabilistic approach, which is incorporated by reference in its entirety. In addition, please reference US patent publication number "US2021273958A1 filed Feb. 26, 2021, titled "Multi-stage anomaly detection for process chains in multi-host environments" for another example anomalous behavior detector using a recurrent neural network and a bidirectional long short-term memory (LSTM), which is incorporated by reference in its entirety. In addition, please reference US patent publication number "US2020244673A1, filed Apr. 23, 2019, titled "Multivariate network structure anomaly detector," which is incorporated by reference in its entirety, for another example anomalous behavior detector with a Multivariate Network and Artificial Intelligence classifiers.

Next, as discussed further below, as discussed further below, during pre-deployment the cyber threat analyst module 120 and the analyzer module 115 can use data analysis processes and cooperate with AI model(s) 160 trained on forming and investigating hypotheses on what are a possible set of cyber threats. In addition, another set of AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful.

Similarly, during deployment, the data analysis processes (discussed herein) used by the analyzer module 115 can use unsupervised machine learning to update the initial training learned during pre-deployment, and then update the training with unsupervised learning algorithms during the cyber security appliance's 100 deployment in the system being protected when various different steps to either i) support or ii) refute the possible set of cyber threats hypotheses worked better or worked worse.

The AI model(s) 160 trained on a normal pattern of life of entities in a domain under analysis may perform the threat detection through a probabilistic change in a normal behavior through the application of, for example, an unsupervised Bayesian mathematical model to detect a behavioral change in computers and computer networks. The Bayesian probabilistic approach can determine periodicity in multiple time series data and identify changes across single and multiple time series data for the purpose of anomalous behavior detection. In an example, a system being protected can include both email and IT network domains under analysis. Thus, email and IT network raw sources of data can be examined along with a large number of derived metrics that each produce time series data for the given metric.

Additional Module Interactions

Referring back to FIG. 4, the gather module 110 cooperates with the data store 135. The data store 135 stores comprehensive logs for network traffic observed. These logs can be filtered with complex logical queries and each IP packet can be interrogated on a vast number of metrics in the network information stored in the data store. Similarly, other domain's communications and data, such as emails, logs, etc. may be collected and stored in the data store 135. The gather module 110 may consist of multiple automatic data gatherers that each look at different aspects of the data depending on the particular hypothesis formed for the analysed event. The data relevant to each type of possible hypothesis can be automatically pulled from additional external and internal sources. Some data is pulled or retrieved by the gather module 110 for each possible hypothesis.

The data store 135 can store the metrics and previous threat alerts associated with network traffic for a period of time, which is, by default, at least 27 days. This corpus of data is fully searchable. The cyber security appliance 100 works with network probes to monitor network traffic and store and record the data and metadata associated with the network traffic in the data store.

The gather module 110 may have a process identifier classifier. The process identifier classifier can identify and track each process and device in the network, under analysis, making communication connections. The data store 135 cooperates with the process identifier classifier to collect and maintain historical data of processes and their connections, which is updated over time as the network is in operation. In an example, the process identifier classifier can identify each process running on a given device along with its endpoint connections, which are stored in the data store. Similarly, data from any of the domains under analysis may be collected and compared.

Examples of domains/networks under analysis being protected can include any of i) an Informational Technology network, ii) an Operational Technology network, iii) a Cloud service, iv) a SaaS service, v) an endpoint device, vi) an email domain, and vii) any combinations of these. A domain module, such as the cloud module 145 and the email module 150 is constructed and coded to interact with and understand a specific domain.

For instance, the cloud module 145 may receive information from and send information to, in this example, cloud network-based sensors (i.e., probes, taps, etc.). The cloud domain module 145 also has algorithms and components configured to understand, in this example, cloud parameters, cloud protocols, cloud activity, and other cloud network characteristics of the network under analysis. The second domain module 150 is, in this example, an email module. The email module 150 can be configured to receive information from and send information to, in this example, email-based sensors (i.e., probes, taps, etc.). The email domain module 150 also has algorithms and components configured to understand, in this example, email parameters, email protocols and formats, email activity, and other email characteristics of the network under analysis. Additional domain modules can also collect domain data from another respective domain.

The coordinator module 155 is configured to work with various machine learning algorithms and relational mechanisms to i) assess, ii) annotate, and/or iii) position in a vector diagram, a directed graph, a relational database, etc., activity including events occurring, for example, in the first domain compared to activity including events occurring in the second domain. The domain modules can cooperate to exchange and store their information with the data store.

The process identifier classifier (not shown) in the gather module 110 can cooperate with additional classifiers in each of the cloud and email modules 145/150 to assist in tracking individual processes and associating them with entities in a domain under analysis as well as individual processes and how they relate to each other. The process identifier classifier can cooperate with other trained AI classifiers in the modules to supply useful metadata along with helping to make logical nexuses.

A feedback loop of cooperation exists between the gather module 110, the analyzer module 115, AI model(s) 160 trained on different aspects of this process, and the cyber threat analyst module 120 to gather information to determine whether a cyber threat is potentially attacking the networks/domains under analysis.

Determination of Whether Something is Likely Malicious

In the following examples the analyzer module 115 and/or cyber threat analyst module 120 can use multiple factors to the determination of whether a process, event, object, entity, etc. is likely malicious.

In an example, the analyzer module 115 and/or cyber threat analyst module 120 can cooperate with one or more of the AI model(s) 160 trained on certain cyber threats to detect whether the anomalous activity detected, such as suspicious email messages, exhibit traits that may suggest a malicious intent, such as phishing links, scam language, sent from suspicious domains, etc. The analyzer module 115 and/or cyber threat analyst module 120 can also cooperate with one of more of the AI model(s) 160 trained on potential IT based cyber threats to detect whether the anomalous activity detected, such as suspicious IT links, URLs, domains, user activity, etc., may suggest a malicious intent as indicated by the AI models trained on potential IT based cyber threats.

In the above example, the analyzer module 115 and/or the cyber threat analyst module 120 can cooperate with the one or more AI models 160 trained with machine learning on the normal pattern of life for entities in an email domain under analysis to detect, in this example, anomalous emails which are detected as outside of the usual pattern of life for each entity, such as a user, email server, etc., of the email network/domain. Likewise, the analyzer module 115 and/or the cyber threat analyst module 120 can cooperate with the one or more AI models trained with machine learning on the normal pattern of life for entities in a second domain under analysis (in this example, an IT network) to detect, in this example, anomalous network activity by user and/or devices in the network, which is detected as outside of the usual pattern of life (e.g. abnormal) for each entity, such as a user or a device, of the second domain's network under analysis.

Thus, the analyzer module 115 and/or the cyber threat analyst module 120 can be configured with one or more data analysis processes to cooperate with the one or more of the AI model(s) 160 trained with machine learning on the normal pattern of life in the system, to identify an anomaly of at least one of i) the abnormal behavior, ii) the suspicious activity, and iii) the combination of both, from one or more entities in the system. Note, other sources, such as other model breaches, can also identify at least one of i) the abnormal behavior, ii) the suspicious activity, and iii) the combination of both to trigger the investigation.

Accordingly, during this cyber threat determination process, the analyzer module 115 and/or the cyber threat analyst module 120 can also use AI classifiers that look at the features and determine a potential maliciousness based on commonality or overlap with known characteristics of malicious processes/entities. Many factors including anomalies that include unusual and suspicious behavior, and other indicators of processes and events are examined by the one or more AI models 160 trained on potential cyber threats and/or the AI classifiers looking at specific features for their malicious nature in order to make a determination of whether an individual factor and/or whether a chain of anomalies is determined to be likely malicious.

Initially, in this example of activity in an IT network analysis, the rare JA3 hash and/or rare user agent connections for this network coming from a new or unusual process are factored just like in the first wireless domain suspicious wireless signals are considered. These are quickly determined by referencing the one or more of the AI models 160 trained with machine learning on the pattern of life of each device and its associated processes in the system. Next, the analyzer module 115 and/or the cyber threat analyst module 120 can have an external input to ingest threat intelligence from other devices in the network cooperating with the cyber security appliance 100. Next, the analyzer module 115 and/or the cyber threat analyst module 120 can look for other anomalies, such as model breaches, while the AI models trained on potential cyber threats can assist in examining and factoring other anomalies that have occurred over a given timeframe to see if a correlation exists between a series of two or more anomalies occurring within that time frame.

The analyzer module 115 and/or the cyber threat analyst module 120 can combine these Indicators of Compromise (e.g., unusual network JA3, unusual device JA3, . . . ) with many other weak indicators to detect the earliest signs of an emerging threat, including previously unknown threats, without using strict blacklists or hard-coded thresholds. However, the AI classifiers can also routinely look at blacklists, etc. to identify maliciousness of features looked at.

Another example of features may include a deeper analysis of endpoint data. This endpoint data may include domain metadata, which can reveal peculiarities such as one or more indicators of potentially a malicious domain (i.e., its URL). The deeper analysis may assist in confirming an analysis to determine that indeed a cyber threat has been detected. The analyzer module 115 can also look at factors of how rare the endpoint connection is, how old the endpoint is, where geographically the endpoint is located, how a security certificate associated with a communication is verified only by an endpoint device or by an external 3rd party, just to name a few additional factors. The analyzer module 115 (and similarly the cyber threat analyst module 120) can then assign weighting given to these factors in the machine learning that can be supervised based on how strongly that characteristic has been found to match up to actual malicious sites in the training.

Another AI classifier is configured to find potentially malicious indicators, the agent analyzer data analysis process in the analyzer module 115 and/or cyber threat analyst module 120 may cooperate with the process identifier classifier to identify all of the additional factors of i) are one or more processes running independently of other processes, ii) are the one or more processes running independent are recent to this network, and iii) are the one or more processes running independent connect to the endpoint, which the endpoint is a rare connection for this network, which are referenced and compared to one or more AI models trained with machine learning on the normal behavior of the pattern of life of the system.

Note, a user agent, such as a browser, can act as a client in a network protocol used in communications within a client-server distributed computing system. In particular, the Hypertext Transfer Protocol (HTTP) identifies the client software originating (an example user agent) the request, using a user-agent header, even when the client is not operated by a user. Note, this identification can be faked, so it is only a weak indicator of the software on its own, but when compared to other observed user agents on the device, this can be used to identify possible software processes responsible for requests.

The analyzer module 115 and/or the cyber threat analyst module 120 may use the agent analyzer data analysis process that detects a potentially malicious agent previously unknown to the system to start an investigation on one or more possible cyber threat hypotheses. The determination and output of this step is what are possible cyber threats that can include or be indicated by the identified abnormal behavior and/or identified suspicious activity identified by the agent analyzer data analysis process.

In an example, the cyber threat analyst module 120 can use the agent analyzer data analysis process and the AI models(s) trained on forming and investigating hypotheses on what are a possible set of cyber threats to use the machine learning and/or set scripts to aid in forming one or more hypotheses to support or refute each hypothesis. The cyber threat analyst module 120 can cooperate with the AI models trained on forming and investigating hypotheses to form an initial set of possible hypotheses, which needs to be intelligently filtered down. The cyber threat analyst module 120 can be configured to use the one or more supervised machine learning models trained on i) agnostic examples of a past history of detection of a multitude of possible types of cyber threat hypotheses previously analyzed by human, who was a cyber security professional, ii) a behavior and input of how a plurality of human cyber security analysts make a decision and analyze a risk level regarding and a probability of a potential cyber threat, iii) steps to take to conduct an investigation start with anomaly via learning how expert humans tackle investigations into specific real and synthesized cyber threats and then the steps taken by the human cyber security professional to narrow down and identify a potential cyber threat, and iv) what type of data and metrics that were helpful to further support or refute each of the types of cyber threats, in order to determine a likelihood of whether the abnormal behavior and/or suspicious activity is either i) malicious or ii) benign?

The cyber threat analyst module 120 using AI models, scripts and/or rules based modules is configured to conduct initial investigations regarding the anomaly of interest, collected additional information to form a chain of potentially related/linked information under analysis and then form one or more hypotheses that could have this chain of information that is potentially related/linked under analysis and then gather additional information in order to refute or support each of the one or more hypotheses.

The cyber threat analyst module using AI models, scripts and/or rules-based modules is configured to conduct initial investigations regarding the anomaly of interest, collected additional information to form a chain of potentially related/linked information under analysis and then form one or more hypotheses that could have this chain of information that is potentially related/linked under analysis and then gather additional information in order to refute or support each of the one or more hypotheses.

In an example, a behavioral pattern analysis of what are the unusual behaviors of the network/system/device/user under analysis by the machine learning models may be as follows. The coordinator module can tie the alerts, activities, and events from, in this example, the email domain to the alerts, activities, and events from the cloud network domain. FIG. 5 illustrates a graph 220 of an embodiment of an example chain of unusual behavior for, in this example, the email activities and cloud network activities deviating from a normal pattern of life in connection with the rest of the system/network under analysis. The cyber threat analyst module and/or analyzer module can cooperate with one or more machine learning models. The one or more machine learning models are trained and otherwise configured with mathematical algorithms to infer, for the cyber-threat analysis, 'what is possibly happening with the chain of distinct alerts, activities, and/or events, which came from the unusual pattern,' and then assign a threat risk associated with that distinct item of the chain of alerts and/or events forming the unusual pattern. The unusual pattern can be determined by examining initially what activities/events/alerts that do not fall within the window of what is the normal pattern of life for that network/system/device/user under analysis can be analysed to determine whether that activity is unusual or suspicious. A chain of related activity that can include both unusual activity and activity within a pattern of normal life for that entity can be formed and checked against individual cyber threat hypothesis to determine whether that pattern is indicative of a behavior of a malicious actor—human, program, or other threat. The cyber threat analyst module can go back and pull in some of the normal activities to help support or refute a possible hypothesis of whether that pattern is indicative of a behavior of a malicious actor. An example behavioral pattern included in the chain is shown in the graph over a time frame of, an example, 7 days. The cyber threat analyst module detects a chain of anomalous behavior of unusual data transfers three times, unusual characteristics in emails in the monitored system three times which seem to have some causal link to the unusual data transfers. Likewise, twice unusual credentials attempted the unusual behavior of trying to gain access to sensitive areas or malicious IP addresses and the user associated with the unusual credentials trying unusual behavior has a causal link to at least one of those three emails with unusual characteristics. Again, the cyber security appliance 100 can go back and pull in some of the normal activities to help support or refute a possible hypothesis of whether that pattern is indicative of a behavior of a malicious actor. The analyser module can cooperate with one or more models trained on cyber threats and their behavior to try to determine if a potential cyber threat is causing these unusual behaviors. The cyber threat analyst module can put data and entities into 1) a directed graph and nodes in that graph that are overlapping or close in distance have a good possibility of being related in some manner, 2) a vector diagram, 3) a relational database, and 4) other relational techniques that will at least be examined to assist in creating the chain of related activity connected by causal links, such as similar time, similar entity and/or type of entity involved, similar activity, etc., under analysis. If the pattern of behaviors under analysis is believed to be indicative of a malicious actor, then a score of how confident the system is in this assessment of identifying whether the unusual pattern was caused by a malicious actor is created. Next, also assigned is a threat level score or probability indicative of what level of threat does this malicious actor pose. Lastly, the cyber security appliance 100 is configurable in a user interface, by a user, enabling what type of automatic response actions, if any, the cyber security appliance 100 may take when different types of cyber threats, indicated by the pattern of behaviors under analysis, that are equal to or above a configurable level of threat posed by this malicious actor.

The autonomous response engine 140 of the cyber security system is configured to take one or more autonomous mitigation actions to mitigate the cyber threat during the cyberattack by the cyber threat. The autonomous response engine 140 is configured to reference an Artificial Intelligence model trained to track a normal pattern of life for each node of the protected system to perform an autonomous act of restricting a potentially compromised node having i) an actual indication of compromise and/or ii) merely adjacent to a known compromised node, to merely take actions that are within that node's normal pattern of life to mitigate the cyber threat. Similarly named components in the cyber security restoration engine 190 can operate and function similar to as described for the detection engine.

The chain of the individual alerts, activities, and events that form the pattern including one or more unusual or suspicious activities into a distinct item for cyber-threat analysis of that chain of distinct alerts, activities, and/or events. The cyber-threat module may reference the one or more machine learning models trained on, in this example, e-mail threats to identify similar characteristics from the individual alerts and/or events forming the distinct item made up of the chain of alerts and/or events forming the unusual pattern.

An Assessment of the Cyber Threat in Order to Determine Appropriate Autonomous Actions, for Example, Those by the Autonomous Response Engine In the next step, the analyzer module and/or cyber threat analyst module generates one or more supported possible cyber threat hypotheses from the possible set of cyber threat hypotheses. The analyzer module generates the supporting data and details of why each individual hypothesis is supported or not. The analyzer module can also generate one or more possible cyber threat hypotheses and the supporting data and details of why they were refuted.

In general, the analyzer module cooperates with the following three sources. The analyzer module cooperates with the AI models trained on cyber threats to determine whether an anomaly such as the abnormal behavior and/or suspicious activity is either 1) malicious or 2) benign when the potential cyber threat under analysis is previously unknown to the cyber security appliance 100. The analyzer module cooperates with the AI models trained on a normal behavior of entities in the network under analysis. The analyzer module cooperates with various AI-trained classifiers. With all of these sources, when they input information that indicates a potential cyber threat that is i) severe enough to cause real harm to the network under analysis and/or ii) a close match to known cyber threats, then the analyzer module can make a final determination to confirm that a cyber threat likely exists and send that cyber threat to the assessment module to assess the threat score associated with that cyber threat. Certain model breaches will always trigger a potential cyber threat that the analyzer will compare and confirm the cyber threat.

In the next step, an assessment module with the AI classifiers is configured to cooperate with the analyzer module. The analyzer module supplies the identity of the supported possible cyber threat hypotheses from the possible set of cyber threat hypotheses to the assessment module. The assessment module with the AI classifiers cooperates with the AI model trained on possible cyber threats can make a determination on whether a cyber threat exists and what level of severity is associated with that cyber threat. The assessment module with the AI classifiers cooperates with the one or more AI models trained on possible cyber threats in order to assign a numerical assessment of a given cyber threat hypothesis that was found likely to be supported by the analyzer module with the one or more data analysis processes, via the abnormal behavior, the suspicious activity, or the collection of system data points. The assessment module with the AI classifiers output can be a score (ranked number system, probability, etc.) that a given identified process is likely a malicious process.

The assessment module with the AI classifiers can be configured to assign a numerical assessment, such as a probability, of a given cyber threat hypothesis that is supported and a threat level posed by that cyber threat hypothesis which was found likely to be supported by the analyzer module, which includes the abnormal behavior or suspicious activity as well as one or more of the collection of system data points, with the one or more AI models trained on possible cyber threats.

The cyber threat analyst module in the AI-based cyber security appliance 100 component provides an advantage over competitors' products as it reduces the time taken for cybersecurity investigations, provides an alternative to manpower for small organizations and improves detection (and remediation) capabilities within the cyber security platform.

The AI-based cyber threat analyst module performs its own computation of threat and identifies interesting network events with one or more processors. These methods of detection and identification of threat all add to the above capabilities that make the AI-based cyber threat analyst module a desirable part of the cyber security appliance 100. The AI-based cyber threat analyst module offers a method of prioritizing which is not just a summary or highest score alert of an event evaluated by itself equals the most bad, and prevents more complex attacks being missed because their composite parts/individual threats only produced low-level alerts.

The AI classifiers can be part of the assessment component, which scores the outputs of the analyzer module. Again, as for the other AI classifiers discussed, the AI classifier can be coded to take in multiple pieces of information about an entity, object, and/or thing and based on its training and then output a prediction about the entity, object, or thing. Given one or more inputs, the AI classifier model will try to predict the value of one or more outcomes. The AI classifiers cooperate with the range of data analysis processes that produce features for the AI classifiers. The various techniques cooperating here allow anomaly detection and assessment of a cyber threat level posed by a given anomaly; but more importantly, an overall cyber threat level posed by a series/chain of correlated anomalies under analysis.

In the next step, the formatting module can generate an output such as a printed or electronic report with the relevant data. The formatting module can cooperate with both the analyzer module and the assessment module depending on what the user wants to be reported.

The formatting module is configured to format, present a rank for, and output one or more supported possible cyber threat hypotheses from the assessment module into a formalized report, from one or more report templates populated with the data for that incident.

The formatting module is configured to format, present a rank for, and output one or more detected cyber threats from the analyzer module or from the assessment module into a formalized report, from one or more report templates populated with the data for that incident. Many different types of formalized report templates exist to be populated with data and can be outputted in an easily understandable format for a human user's consumption.

The formalized report on the template is outputted for a human user's consumption in a medium of any of 1) printable report, 2) presented digitally on a user interface, 3) in a machine readable format for further use in machine-learning reinforcement and refinement, or 4) any combination of the three. The formatting module is further configured to generate a textual write up of an incident report in the formalized report for a wide range of breaches of normal behavior, used by the AI models trained with machine learning on the normal behavior of the system, based on analyzing previous reports with one or more models trained with machine learning on assessing and populating relevant data into the incident report corresponding to each possible cyber threat. The formatting module can generate a threat incident report in the formalized report from a multitude of a dynamic human-supplied and/or machine created templates corresponding to different types of cyber threats, each template corresponding to different types of cyber threats that vary in format, style, and standard fields in the multitude of templates. The formatting module can populate a given template with relevant data, graphs, or other information as appropriate in various specified fields, along with a ranking of a likelihood of whether that hypothesis cyber threat is supported and its threat severity level for each of the supported cyber threat hypotheses, and then output the formatted threat incident report with the ranking of each supported cyber threat hypothesis, which is presented digitally on the user interface and/or printed as the printable report.

In the next step, the assessment module with the AI classifiers, once armed with the knowledge that malicious activity is likely occurring/is associated with a given process from the analyzer module, then cooperates with the autonomous response engine 140 to take an autonomous action such as i) deny access in or out of the device or the network and/or ii) shutdown activities involving a detected malicious agent.

The autonomous response engine 140, rather than a human taking an action, can be configured to cause one or more rapid autonomous mitigation actions to be taken to counter the cyber threat. A user interface for the response module can program the autonomous response engine 140 i) to merely make a suggested response to take to counter the cyber threat that will be presented on a display screen and/or sent by a notice to an administrator for explicit authorization when the cyber threat is detected or ii) to autonomously take a response to counter the cyber threat without a need for a human to approve the response when the cyber threat is detected. The autonomous response engine 140 will then send a notice of the autonomous response as well as display the autonomous response taken on the display screen. Example autonomous responses may include cut off connections, shutdown devices, change the privileges of users, delete and remove malicious links in emails, slow down a transfer rate, and other autonomous actions against the devices and/or users. The autonomous response engine 140 uses one or more Artificial Intelligence models that are configured to intelligently work with other third-party defense systems in that customer's network against threats. The autonomous response engine 140 can send its own protocol commands to devices and/or take actions on its own. In addition, the autonomous response engine 140 uses the one or more Artificial Intelligence models to orchestrate with other third-party defense systems to create a unified defense response against a detected threat within or external to that customer's network. The autonomous response engine 140 can be an autonomous self-learning response coordinator that is trained specifically to control and reconfigure the actions of traditional legacy computer defenses (e.g., firewalls, switches, proxy servers, etc.) to contain threats propagated by, or enabled by, networks and the internet. The cyber threat module can cooperate with the autonomous response engine 140 to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

The trigger module, analyzer module, assessment module, and formatting module cooperate to improve the analysis and formalized report generation with less repetition to consume CPU cycles with greater efficiency than humans repetitively going through these steps and re-duplicating steps to filter and rank the one or more supported possible cyber threat hypotheses from the possible set of cyber threat hypotheses.

Again, the multiple (e.g., four) Artificial Intelligence-based engines have communication hooks in between them to exchange a significant amount of behavioral metrics including data between the multiple Artificial Intelligence-based engines to work in together to provide an overall cyber threat response. The AI adaptive incident response loop has interaction and orchestration between the multiple (four) self-learning AI components, each trained and focused on their individual machine-learned tasks of i) detecting a cyber threat, ii) how to conduct a simulation and make the prediction about a cyberattack, iii) how to make and what types of autonomous mitigation responses can be made in response to a cyberattack and iv) what level of restrictions are needed and how to invoke restoration actions to restore nodes in the system being protected while still mitigating effects of the cyberattack. The Artificial Intelligence in each of the engines trained and focused on performing their corresponding machine-learned tasks as well as the orchestration between the Artificial Intelligence-based engines drive the exchange to make them work in together against a cyberattack by the cyber threat (e.g., malicious actor). The intelligent orchestration component facilitates the multiple example stages of the Artificial Intelligence augmented and adaptive interactive response loop between these four Artificial Intelligence-based engines.

FIG. 2 illustrates a diagram of an example sixth stage of the interactive Artificial Intelligence-based response loop between the multiple Artificial Intelligence-based engines working in tandem to provide an overall cyber threat response. The cyber-attack simulator after running the Artificial Intelligence-based simulations communicates to the autonomous response engine 140 the locations where it could block the likely and/dangerous next moves by the attacker. The Artificial Intelligence in the autonomous response engine 140 analyzes the simulation results and grabs any additional information needed to decide what nodes need autonomous actions and what mitigation actions to take to each node that is compromised and potentially its neighboring nodes. The Artificial Intelligence in the autonomous response engine 140 reasons and takes action. The AI engines also update the report visible to the human cyber security team.

This interactive Artificial Intelligence-based response loop between the multiple Artificial Intelligence-based engines working together continues on. The intelligent orchestration component uses unsupervised machine learning algorithms to self-learn from previous cyber threat incidents (and their aftermath) on tasks such as how the response went, what worked, what did not, how long things took and how this compared to previous occasions and to expectations, and then uses this information to adjust future incident response expectations and priorities. The intelligent orchestration component can use action success/completion and time taken as measures of improvement. Likewise, the restoration engine can use unsupervised machine learning algorithms to self-learn from previous cyber threat incidents to get better at healing the system being protected to mitigate the cyber threat while minimizing an impact on the system being protected. Likewise, the cyber security restoration engine 190 can use one or more unsupervised machine learning algorithms, as a self-learning entity, to have an ability to learn how to restore the one or more nodes in the graph of the protected system back to the trusted operational state while still mitigating against the cyber threat so the cyber security restoration engine 190 gets better over time of a deployment of the cyber security restoration engine 190 by learning from previous restoration attempts (e.g. action success/completion and time taken as measures, action effectiveness as a measure, etc., as well as including or adapting changes to previous recommendations made by the human security team.

The cyber threat detection engine, the autonomous response engine 140, the cyber-attack simulator all perform their machine-learned task and send inputs to each other to assist in determining what nodes are impacted, what cyber threat is causing the problems, and how the cyberattack likely occurred and will progress based upon possible mitigation and restoration actions taken so that the restoration engine can rely on the determinations by the Artificial Intelligence in those AI-based engines to give the restoration engine a fantastic starting point for figuring out what is the system being protected is trying to recover from and then a best way to restore the nodes in the system.

There are four discrete AI-based engines working to achieve aims with their own machine learning approaches. Each separate AI contributes data that has been processed intelligently through machine learning approaches and then hands over the processed behavioral metrics to another AI engine which then performs its own individualized machine-learned task.

The cyber-attack simulator 105 in conducting simulations can use the cyber threat analyst module with external data input (e.g., crowdstrike) and cooperate with the detection engine to identify an infected patient zero and additional devices actually compromised and/or directly linked to devices actually compromised in need of remediation. The linked devices or the activity may not be directly visible to the detection engine alone and the external data input fills in the big picture. The cyber security restoration engine 190 to restore the protected system can potentially use the external data input that the system is receiving from third party integrations (e.g., from host-based agents from 3rd party vendors, antivirus and-based testing antivirus, etc. to identify patient zero of the attack, identify, where the attack has happened and is happening, identify devices that the system reasonably believes are linked to the compromised entity, and recommend remediation or perform remediation via AI alone, and/or AI in combination with human assistance. The cyber security restoration engine 190 can restore the protected system back to a state before a compromise (e.g., abnormalities started) by a cyber threat occurred to the protected system. The cyber security restoration engine 190 restores nodes in the protected system to cyberattacks in progress—so heals in real time, as an attack happens, as well as can assist in healing after an attack has taken place.

The trusted operational state of a node can be an operational state for a date and time before the earliest detection of a possible compromise of a node in the graph (device and/or user account) plus a threshold buffer amount of time.

In an example, the detection engine can use historic IaaS data on virtual resource usage to identify errant virtual resources and the autonomous response engine 140 to spin down those resources or disable overactive microservices like lambdas. In another example, the detection engine can use historic IaaS data on virtual resource usage to understand when a client is undergoing some kind of DDOS and the autonomous response engine 140 acts to do scaling to handle the load until the overload is over. The restoration engine can recommend controlling the scaling when the system understands deliberate overloading of traffic is occurring and then bringing that scaling back down again to assist their service architectures to deal with situations when some cyber threat is trying to overload those systems to bring that customer down.

In another example, the cyber security restoration engine 190 to restore the protected system can use historic source codebase information and modelling from the AI models in the detection engine for development to revert commits and code changes that potentially introduce bad or compromised code. The cyber security restoration engine 190 to restore the protected system can also use historic records of a source code database information to find out when during the development of a product that the cyber-attack occurred on the source code in order to restore the source code back to the state before the compromise occurred, as well as use historic code base analysis and understanding to identify supply chain and products vulnerable to bad code/compromised code and sending an update package/at least a notice to revert those products and further prevent the source code vulnerabilities from trickling down the supply chains from the vendor to the end user. Once file data of a cyber threat is identified, then that file data and its characteristics are captured in an inoculation package and then cascade that file information to each cyber security appliance in the fleet of cyber security appliances, and quarantine the identical and very similar files in order to remove them from all of the environments before anything can spread even more than it has via immediate remediation and also using the system's own inoculation data.

In an example, the autonomous response engine 140 can stop a device that is infected from connecting to other nodes. In addition, the autonomous response engine 140 can restrict reading and writing traffic and/or types of data/information being communicated in that traffic to restrict traffic movement and process activity to nodes close to an entity that the system thinks is performing erroneously or infected.

Referring to FIG. 4, the autonomous response engine 140 is configured to use one or more Application Programming Interfaces to translate desired mitigation actions for nodes (devices, user accounts, etc.) into a specific language and syntax utilized by that device, user account, etc. from potentially multiple different vendors being protected in order to send the commands and other information to cause the desired mitigation actions to change, for example, a behavior of a detected threat of a user and/or a device acting abnormal to the normal pattern of life. The selected mitigation actions on the selected nodes minimize an impact on other parts of the system being protected (e.g., devices and users) that are i) currently active in the system being protected and ii) that are not in breach of being outside the normal behavior benchmark. The autonomous response engine 140 can have a discovery module to i) discover capabilities of each node being protected device and the other cyber security devices (e.g., firewalls) in the system being protected and ii) discover mitigation actions they can take to counter and/or contain the detected threat to the system being protected, as well as iii) discover the communications needed to initiate those mitigation actions.

For example, the autonomous response engine 140 cooperates and coordinates with an example set of network capabilities of various network devices. The network devices may have various capabilities such as identity management including setting user permissions, network security controls, firewalls denying or granting access to various ports, encryption capabilities, centralize logging, antivirus anti-malware software quarantine and immunization, patch management, etc., and also freeze any similar, for example, network activity, etc. triggering the harmful activity on the system being protected.

Accordingly, the autonomous response engine 140 will take an autonomous mitigation action to, for example, shutdown the device or user account, block login failures, perform file modifications, block network connections, restrict the transmission of certain types of data, restrict a data transmission rate, remove or restrict user permissions, etc. The autonomous response engine 140 for an email system could initiate example mitigation actions to either remedy or neutralize the tracking link, when determined to be the suspicious covert tracking link, while not stopping every email entering the email domain with a tracking link, or hold the email communication entirely if the covert tracking link is highly suspicious, and also freeze any similar, for example, email activity triggering the harmful activity on the system being protected.

The autonomous response engine 140 has a default set of autonomous mitigation actions shown on its user interface that it knows how to perform when the different types of cyber threats are equal to or above a user configurable threshold posed by this type of cyber threat. The autonomous response engine 140 is also configurable in its user interface to allow the user to augment and change what type of automatic mitigation actions, if any, the autonomous response engine 140 may take when different types of cyber threats that are equal to or above the configurable level of threat posed by a cyber threat.

The autonomous response engine 140 can also reference its artificial intelligence trained to perform mitigation actions. Again, the autonomous response engine 140 has an administrative tool in its user interface to program/set what autonomous mitigation actions the autonomous response engine 140 can take, including types of mitigation actions and specific mitigation actions the autonomous response engine 140 is capable of, when the cyber-threat module in the detection engine indicates the threat risk parameter is equal to or above the actionable threshold, selectable by the cyber professional. The cyber professional can also indicate what types of mitigation actions can be performed for different users and parts of the system as well as what actions need the cyber professional to approve. Again, the autonomous response engine 140 can also reference a default library of mitigation actions, types of mitigation actions and specific mitigation actions the autonomous response engine 140 is capable of on a particular node.

Referring to FIG. 1, the cyber-attack simulator 105 using Artificial Intelligence-based simulations is communicatively coupled to a cyber security appliance 100, an open source (OS) database server 790, an email system 796, one or more endpoint computing devices 791A-B, and an IT network system 792 with one or more entities, over one or more networks 791/792 in the system being protected.

The cyber-attack simulator 105 with Artificial Intelligence-based simulations is configured to integrate with the cyber security appliance 100 and cooperate with components within the cyber security appliance 100 installed and protecting the network from cyber threats by making use of outputs, data collected, and functionality from two or more of a data store, other modules, and one or more AI models already existing in the cyber security appliance 100.

The cyber-attack simulator 105 may include a cyber threat generator module to generate many different types of cyber threats with the past historical attack patterns to attack the simulated system to be generated by the simulated attack module 750 that will digitally/virtually replicate the system being protected, such as a phishing email generator configured to generate one or more automated phishing emails to pentest the email defenses and/or the network defenses provided by the cyber security appliance 100. For example, the system being protected can be an email system and then the phishing email generator may be configured to cooperate with the trained AI models to customize the automated phishing emails based on the identified data points of the organization and its entities.

The email module and cloud module may use a vulnerability tracking module to track and profile, for example, versions of software and a state of patches and/or updates compared to a latest patch and/or update of the software resident on devices in the system/network. The vulnerability tracking module can supply results of the comparison of the version of software as an actual detected vulnerability for each particular node in the system being protected, which is utilized by the node exposure score generator and the cyber-attack simulator 105 with Artificial Intelligence-based simulations in calculating 1) the spread of a cyber threat and 2) a prioritization of remediation actions on a particular node compared to the other network nodes with actual detected vulnerabilities. The node exposure score generator is configured to also factor in whether the particular node is exposed to direct contact by an entity generating the cyber threat (when the threat is controlled from a location external to the system e.g., network) or the particular node is downstream of a node exposed to direct contact by the entity generating the cyber threat external to the network.

The node exposure score generator and the simulated attack module 750 in the cyber-attack simulator 105 cooperate to run the one or more hypothetical simulations of an actual detected cyber threat incident and/or a hypothetical cyberattack incident to calculate the node paths of least resistance in the virtualized instance/modeled instance of the system being protected. The progress through the node path(s) of least resistance through the system being protected are plotted through the various simulated instances of components of the graph of the system being protected until reaching a suspected end goal of the cyber-attack scenario, all based on historic knowledge of connectivity and behavior patterns of users and devices within the system under analysis. The simulated attack module 750, via a simulator and/or a virtual network clone creator, can be programmed to model and work out the key paths and devices in the system (e.g., a network, with its nets and subnets), via initially mapping out the system being protected and querying the cyber security appliance on specific's known about the system being protected by the cyber security appliance 100. The simulated attack module 750 is configured to search and query, two or more of i) a data store, ii) modules in the detection engine, and iii) the one or more Artificial Intelligence (AI) models making up the cyber security appliance 100 protecting the actual network under analysis from cyber threats, on what, i) the data store, ii) the modules, and iii) the one or more AI models in the cyber security appliance 100, already know about the nodes of the system, under analysis to create the graph of nodes of the system being protected. Thus, the cyber-attack simulator 105 with Artificial Intelligence-based simulations is configured to construct the graph of the virtualized version of the system from knowledge known and stored by modules, a data store, and one or more AI models of a cyber security appliance 100 protecting an actual network under analysis. The knowledge known and stored is obtained at least from ingested traffic from the actual system under analysis. Thus, the virtualized system, and its node components/accounts connecting to the network, being tested during the simulation are up to date and accurate for the time the actual system under analysis is being tested and simulated because the cyber-attack simulator 105 with Artificial Intelligence-based simulations is configured to obtain actual network data collected by two or more of 1) modules, 2) a data store, and 3) one or more AI models of a cyber security appliance protecting the actual network under analysis from cyber threats. The simulated attack module 750 will make a model incorporating the actual data of the system through the simulated versions of the nodes making up that system for running simulations on the simulator. Again, a similar approach is taken when the simulated attack module 750 uses a clone creator to spin up and create a virtual clone of the system being protected with virtual machines in the cloud.

The cyber-attack simulator 105 with Artificial Intelligence-based simulations is configured to simulate the compromise of a spread of the cyber threat being simulated in the simulated cyber-attack scenario, based on historical and/or similar cyber threat attack patterns, between the devices connected to the virtualized network, via a calculation on an ease of transmission of the cyber threat algorithm, from 1) an originally compromised node by the cyber threat, 2) through to other virtualized/simulated instances of components of the virtualized network, 3) until reaching a suspected end goal of the cyber-attack scenario, including key network devices. The cyber-attack simulator 105 with Artificial Intelligence-based simulations also calculates how likely it would be for the cyber-attack to spread to achieve either of 1) a programmable end goal of that cyber-attack scenario set by a user, or 2) set by default an end goal scripted into the selected cyber-attack scenario.

The email module and the cloud module can include a profile manager module. The profile manager module is configured to maintain a profile tag on all of the devices connecting to the actual system/network under analysis based on their behavior and security characteristics and then supply the profile tag for the devices connecting to the virtualized instance of the system/network when the construction of the graph occurs. The profile manager module is configured to maintain a profile tag for each device before the simulation is carried out; and thus, eliminates a need to search and query for known data about each device being simulated during the simulation. This also assists in running multiple simulations of the cyberattack in parallel.

The cyber-attack simulator 105 with Artificial Intelligence-based simulations module is configured to construct the graph of the virtualized system, e.g. a network with its nets and subnets, where two or more of the devices connecting to the virtualized network are assigned with different weighting resistances to malicious compromise from the cyber-attack being simulated in the simulated cyber-attack scenario based on the actual cyber-attack on the virtualized instance of the network and their node vulnerability score. In addition to a weighting resistance to the cyberattack, the calculations in the model for the simulated attack module 750 factor in the knowledge of a layout and connection pattern of each particular network device in a network, an amount of connections and/or hops to other network devices in the network, how important a particular device (a key importance) determined by the function of that network device, the user(s) associated with that network device, and the location of the device within the network. Note, multiple simulations can be conducted in parallel by the orchestration module. The simulations can occur on a periodic regular basis to pentest the cyber security of the system and/or in response to a detected ongoing cyberattack in order to get ahead of the ongoing cyberattack and predict its likely future moves. Again, the graph of the virtualize instance of the system is created with two or more of 1) known characteristics of the network itself, 2) pathway connections between devices on that network, 3) security features and credentials of devices and/or their associated users, and 4) behavioral characteristics of the devices and/or their associated users connecting to that network, which all of this information is obtained from what was already know about the network from the cyber security appliance.

During an ongoing cyberattack, the simulated attack module 750 is configured to run the one or more hypothetical simulations of the detected cyber threat incident and feed details of a detected incident by a cyber threat module in the detection engine into the collections module of the cyberattack simulator 105 using Artificial Intelligence-based simulations. The simulated attack module 750 is configured to run one or more hypothetical simulations of that detected incident in order to predict and assist in the triggering an autonomous response by the autonomous response engine 140 and then restoration by the restoration engine to the detected incident.

The simulated attack module 750 ingests the information for the purposes of modeling and simulating a potential cyberattacks against the network and routes that an attacker would take through the network. The simulated attack module 750 can construct the graph of nodes with information to i) understand an importance of network nodes in the network compared to other network nodes in the network, and ii) to determine key pathways within the network and vulnerable network nodes in the network that a cyber-attack would use during the cyber-attack, via modeling the cyber-attack on at least one of 1) a simulated device version and 2) a virtual device version of the system being protected under analysis. Correspondingly, the calculated likelihood of the compromise and timeframes for the spread of the cyberattack is tailored and accurate to each actual device/user account (e.g., node) being simulated in the system because the cyber-attack scenario is based upon security credentials and behavior characteristics from actual traffic data fed to the modules, data store, and AI models of the cyber security appliance.

The cyber-attack simulator 105 with its Artificial Intelligence trained on how to conduct and perform cyberattack in a simulation in either a simulator or in a clone creator spinning up virtual instances on virtual machines will take a sequence of actions and then evaluate the actual impact after each action in the sequence, in order to yield a best possible result to contain/mitigate the detected threat while minimizing the impact on other network devices and users that are i) currently active and ii) not in breach, from different possible actions to take. Again, multiple simulations can be run in parallel so that the different sequences of mitigation actions and restoration actions can be evaluated essentially simultaneously. The cyber-attack simulator 105 with Artificial Intelligence-based simulations in the cyber-attack simulator 105 is configured to use one or more mathematical functions to generate a score and/or likelihood for each of the possible actions and/or sequence of multiple possible actions that can be taken in order to determine which set of actions to choose among many possible actions to initiate. The one or more possible actions to take and their calculated scores can be stacked against each other to factor 1) a likelihood of containing the detected threat acting abnormal with each possible set of actions, 2) a severity level of the detected threat to the network, and 3) the impact of taking each possible set of actions i) on users and ii) on devices currently active in the network not acting abnormal to the normal behavior of the network, and then communicate with the cyber threat detection engine, the autonomous response engine 140, and the cyber-security restoration engine 190, respectively, to initiate the chosen set of actions to cause a best targeted change of the behavior of the detected threat acting abnormal to the normal pattern of life on the network while minimizing the impact on other network devices and users that are i) currently active and ii) not in breach of being outside the normal behavior benchmark. The cyber-attack simulator cooperates with the AI models modelling a normal pattern of life for entities/nodes in the system being protected.

The simulated attack module 750 is programmed itself and can cooperate with the artificial intelligence in the restoration engine to factor an intelligent prioritization of remediation actions and which nodes (e.g., devices and user accounts) in the simulated instance of the system being protected should have a priority compared to other nodes. This can also be reported out to assist in allocating human security team personnel resources that need human or human approval to restore the nodes based on results of the one or more hypothetical simulations of the detected incident.

Note, the cyberattack simulator 105, when doing attack path modelling, does not need to not calculate every theoretically possible path from the virtualized instance of the source device to the end goal of the cyber-attack scenario but rather a set of the most likely paths, each time a hop is made from one node in the virtualized network to another device in the virtualized network, in order to reduce an amount of computing cycles needed by the one or more processing units as well as an amount of memory storage needed in the one or more non-transitory storage mediums.

FIG. 7 illustrates a block diagram of an embodiment of the AI-based cyber security appliance 100 with the cyber security restoration engine 190 and other Artificial Intelligence-based engines plugging in as an appliance platform to protect a system. The probes and detectors monitor, in this example, email activity and IT network activity to feed this data to determine what is occurring in each domain individually to their respective modules configured and trained to understand that domain's information as well as correlate causal links between these activities in these domains to supply this input into the modules of the cyber security appliance 100. The network can include various computing devices such as desktop units, laptop units, smart phones, firewalls, network switches, routers, servers, databases, Internet gateways, etc.

Referring back to FIG. 4, a computer system within a building, can use the cyber security appliance 100 to detect and thereby attempt to prevent threats to computing devices within its bounds. In this exemplary embodiment of the cyber security appliance 100 with the multiple Artificial Intelligence-based engines is implemented on a computer. The computer has the electronic hardware, modules, models, and various software processes of the cyber security appliance 100; and therefore, runs threat detection for detecting threats to the first computer system. As such, the computer system includes one or more processors arranged to run the steps of the process described herein, memory storage components required to store information related to the running of the process, as well as a network interface for collecting the required information for the probes and other sensors collecting data from the network under analysis.

The cyber security appliance 100 in the computer builds and maintains a dynamic, ever-changing model of the 'normal behavior' of each user and machine within the system. The approach is based on Bayesian mathematics, and monitors all interactions, events, and communications within the system—which computer is talking to which, files that have been created, networks that are being accessed.

For example, a second computer is-based in a company's San Francisco office and operated by a marketing employee who regularly accesses the marketing network, usually communicates with machines in the company's U.K. office in second computer system 40 between 9.30 AM and midday, and is active from about 8:30 AM until 6 PM.

The same employee virtually never accesses the employee time sheets, very rarely connects to the company's Atlanta network and has no dealings in South-East Asia. The security appliance takes all the information that is available relating to this employee and establishes a 'pattern of life' for that person and the devices used by that person in that system, which is dynamically updated as more information is gathered. The model of the normal pattern of life for an entity in the network under analysis is used as a moving benchmark, allowing the cyber security appliance 100 to spot behavior on a system that seems to fall outside of this normal pattern of life, and flags this behavior as anomalous, requiring further investigation and/or autonomous action.

The cyber security appliance 100 is built to deal with the fact that today's attackers are getting stealthier, and an attacker/malicious agent may be 'hiding' in a system to ensure that they avoid raising suspicion in an end user, such as by slowing their machine down. The Artificial Intelligence model(s) in the cyber security appliance 100 builds a sophisticated 'pattern of life'—that understands what represents normality for every person, device, and network activity in the system being protected by the cyber security appliance 100.

The self-learning algorithms in the AI can, for example, understand each node's (user account, device, etc.) in an organization's normal patterns of life in about a week, and grows more bespoke with every passing minute. Conventional AI typically relies solely on identifying threats based on historical attack data and reported techniques, requiring data to be cleansed, labelled, and moved to a centralized repository. The detection engine self-learning AI can learn "on the job" from real-world data occurring in the system and constantly evolves its understanding as the system's environment changes. The Artificial Intelligence can use machine learning algorithms to analyze patterns and 'learn' what is the 'normal behavior' of the network by analyzing data on the activity on the network at the device and employee level. The unsupervised machine learning does not need humans to supervise the learning in the model but rather discovers hidden patterns or data groupings without the need for human intervention. The unsupervised machine learning discovers the patterns and related information using the unlabeled data monitored in the system itself. Unsupervised learning algorithms can include clustering, anomaly detection, neural networks, etc. Unsupervised Learning can break down features of what it is analyzing (e.g., a network node of a device or user account), which can be useful for categorization, and then identify what else has similar or overlapping feature sets matching to what it is analyzing.

The cyber security appliance 100 can use unsupervised machine learning to works things out without pre-defined labels. In the case of sorting a series of different entities, such as animals, the system analyzes the information and works out the different classes of animals. This allows the system to handle the unexpected and embrace uncertainty when new entities and classes are examined. The modules and models of the cyber security appliance 100 do not always know what they are looking for, but can independently classify data and detect compelling patterns.

The cyber security appliance's 100 unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network—even when it does not know what it is looking for.

The models in the cyber security appliance 100 can use a Recursive Bayesian Estimation to combine these multiple analyzes of different measures of network behavior to generate a single overall/comprehensive picture of the state of each device, the cyber security appliance 100 takes advantage of the power of Recursive Bayesian Estimation (RBE) via an implementation of the Bayes filter.

Using RBE, the cyber security appliance 100's AI models are able to constantly adapt themselves, in a computationally efficient manner, as new information becomes available to the system. The cyber security appliance 100's AI models continually recalculate threat levels in the light of new evidence, identifying changing attack behaviors where conventional signature-based methods fall down.

Training a model can be accomplished by having the model learn good values for all of the weights and the bias for labeled examples created by the system, and in this case; starting with no labels initially. A goal of the training of the model can be to find a set of weights and biases that have low loss, on average, across all examples.

The AI classifier can receive supervised machine learning with a labeled data set to learn to perform their task as discussed herein. An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

The methods and systems shown in the Figures and discussed in the text herein can be coded to be performed, at least in part, by one or more processing components with any portions of software stored in an executable format on a computer readable medium. Thus, any portions of the method, apparatus and system implemented as software can be stored in one or more non-transitory storage mediums in an executable format to be executed by one or more processors. The computer readable storage mediums may be non-transitory and does not include radio or other carrier waves. The computer readable storage mediums could be, for example, a physical computer readable medium such as semiconductor memory or solid-state memory, magnetic tape, a removable computer diskette, a random-access memory (RAM), a read-only memory (ROM), a rigid magnetic disc, and an optical disk, such as a CD-ROM, CD-R/W or DVD. The various methods described above may also be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Computing Devices

Figure 8:
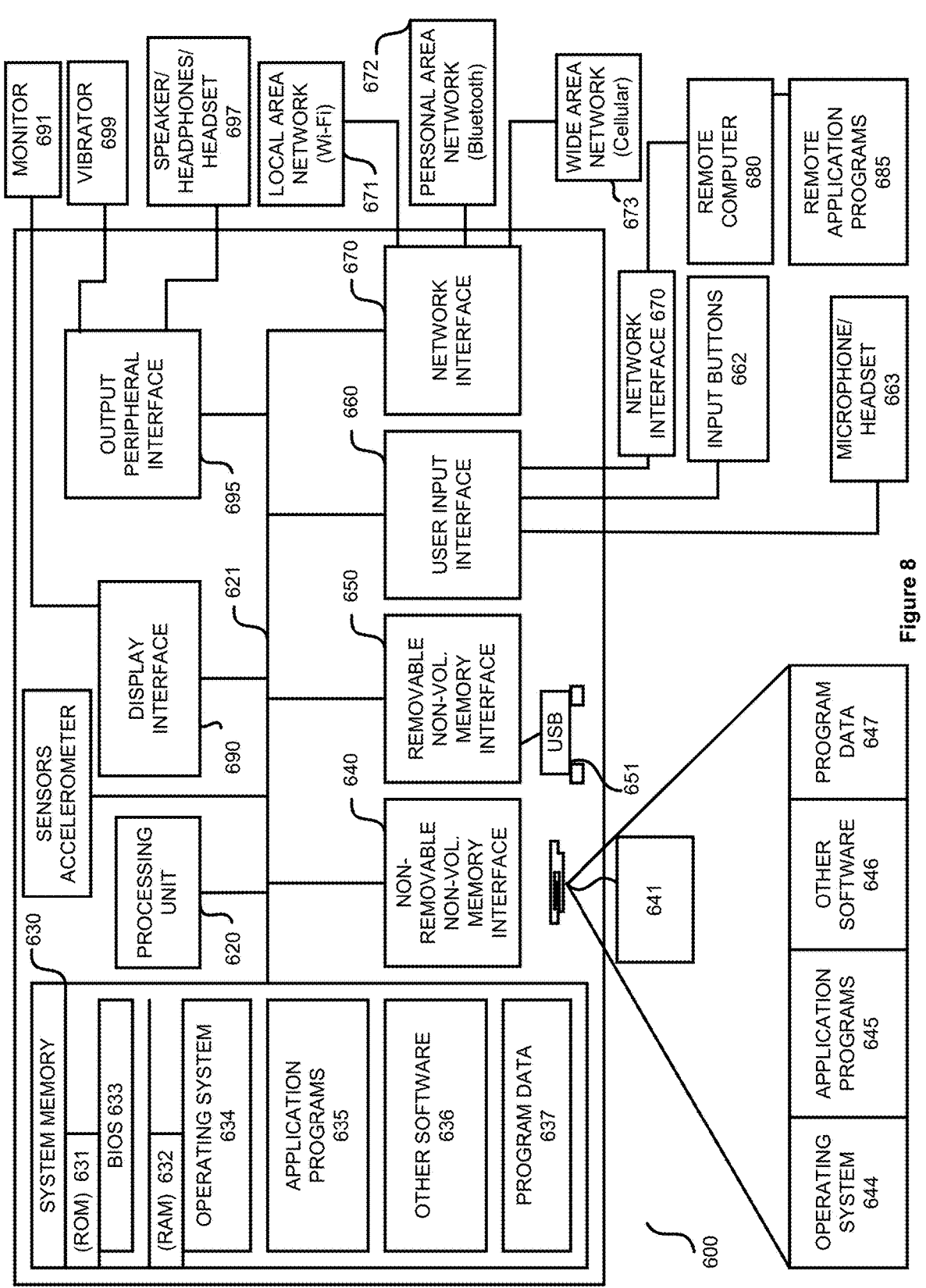
FIG. 8 illustrates a block diagram of an embodiment of one or more computing devices that can be a part of the Artificial Intelligence-based cyber security system including the multiple Artificial Intelligence-based engines, the synthetic cyberattack tool, and the cyber security training tool discussed herein.

FIG. 8 illustrates a block diagram of an embodiment of one or more computing devices that can be a part of the Artificial Intelligence-based cyber security system including the multiple Artificial Intelligence-based engines, the synthetic cyberattack tool, and the cyber security training tool discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 602. Transitory media such as wireless channels are not included in the machine-readable media. Machine-readable media typically embody computer readable instructions, data structures, and other executable software. In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball, or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device, or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets, and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used. It should be noted that the present design can be carried out on a single computing device or on a distributed system in which different portions of the present design are carried out on different parts of the distributed computing system.

Note, an application described herein includes but is not limited to software applications, mobile applications, and programs routines, objects, widgets, plug-ins that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both. A software engine is a core component of a complex system consisting of hardware and software that is capable of performing its function discretely from other portions of the entire complex system but designed to interact with the other portions of the entire complex system.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An apparatus, comprising:
   a synthetic cyberattack tool is configured to use a generative artificial intelligence component to assist in generating a synthetic cyberattack to produce one or more cybersecurity incidents and/or events, and then to provide an analysis and an explanation for a purpose of providing cyber security training to at least one of
   i) an end user of a network and
   ii) a cyber security team member for the network,
   where the synthetic cyberattack tool is configured to cooperate with at least one of a cyberattack simulator and a cloud based war gaming virtual machine platform to perform synthetic cyberattacks in a mimic network, where the mimic network consists of a network of at least one of
   1) an information technology network,
   2) a cloud network, and
   3) an email network,
   corresponding to a portion of an architecture and policies implemented in a real world network that the end user and/or the cyber security team member interacts with, where the mimic network of an organization is implemented in at least one of i) an environment of the cyberattack simulator and
   ii) as virtual machines in a cloud environment of the cloud based war gaming virtual machine platform,
   where the synthetic cyberattack tool is configured to orchestrate the synthetic cyberattack in a wargaming cyberattack exercise in the mimic network utilizing the generative artificial intelligence component, where the synthetic cyberattack tool is configured to derive
   I) the synthetic cyberattack from real world cyberattacks and
   II) the wargaming cyberattack exercise from real world behaviors of the end user and/or the cyber security team member as well as the architecture and policies implemented in the real world network that the end user and/or the cyber security team member interact with,
   where the synthetic cyberattack tool has a user interface component configured to display both results of testing in the wargaming cyberattack exercise along with an explainability on an understanding by the machine learning of the synthetic cyberattack, and
   where the synthetic cyberattack tool is implemented with:
   i) electronic circuits,
   ii) as software stored in one or more non-transitory computer storage mediums and executed one or more processors, or
   iii) any combination of i) and ii).

2. The apparatus of claim 1, where the synthetic cyberattack tool is configured to cooperate with the cyberattack simulator and/or the cloud based war gaming virtual machine platform to communicate with a series of sensors deployed in the mimic network in i) the environment of the cloud based war gaming virtual machine platform and/or ii) the environment of the cyberattack simulator to collect data produced during the wargaming cyberattack exercise, as well as retrieve historical data on a) the real world network, b) the end user, and/or c) the cyber security team member from a data store to utilize the historical data during the wargaming cyberattack exercise.

3. The apparatus of claim 1, where the synthetic cyberattack tool is configured to cooperate with an email inducement text highlighting tool to create one or more phishing emails based upon historical information about types of emails that the end user and/or the cyber security team member, under analysis, has historically received and any inducement within those types of emails, and then to use the phishing emails as part of the synthetic cyberattack.

4. The apparatus of claim 1, where the synthetic cyberattack tool is configured to cooperate with an email inducement text highlighting tool, where the email inducement text highlighting tool has a natural language processor and a transformer model trained on different types of malicious inducements for email users, where the natural language processor is configured to take in text and a structure of the fields of an email to understand the text in the email, and feed them to the transformer model to understand an intent of the text in the email, under analysis, and then for the email inducement text highlighting tool to highlight words and phrases which correspond to one or more of the different types of malicious inducements for email users.

5. The apparatus of claim 1, where the generative artificial intelligence component is an autonomous agent large language model, where the synthetic cyberattack tool is configured to use the autonomous agent large language model to orchestrate what type of cyberattack will be generated in the synthetic cyberattack and then to correlate disparate steps taken by the synthetic cyberattack in the cyberattack simulator and/or the cloud based war gaming virtual machine platform based upon previous cyberattack incidents, including information about detections and model breaches, that have happened, as well as take in information about actions taken to mitigate the synthetic cyberattack that are currently in place, and then suggest what step to take to advance the synthetic cyberattack.

6. The apparatus of claim 1, where the synthetic cyberattack tool is configured to cooperate with the cyberattack simulator to provide attack path modeling data that is incorporated in by the synthetic cyberattack to assist in choosing a particular attack path route through the mimic network based on actual vulnerabilities in the corresponding real world network.

7. The apparatus of claim 1, where the synthetic cyberattack tool is configured to work with the cyberattack simulator and/or the cloud based war gaming virtual machine platform to allow autonomous generation of the synthetic cyberattack and a coordinated series of operations executed by machine learning components working together without a need of a human stitching those operations together.

8. The apparatus of claim 1, where the generative artificial intelligence component is an autonomous agent large language model, where the synthetic cyberattack tool is configured to use the autonomous agent large language model trained on graphs describing a security compromise produced by a human cyber security analyst in order to then produce a graph for the synthetic cyberattack, and then follow nodes of the graph for steps in the synthetic cyberattack in the mimic network.

9. The apparatus of claim 1, where the user interface component is further configured to output aspects of results of the wargaming cyberattack exercise in a form of a printable report and/or report displayable on a display screen, where results of the wargaming cyberattack exercise in the printable report and/or on the displayable report include 1) a log of attack data of how the synthetic cyberattack is progressing on the mimic network, 2) what components in the mimic network are being affected by a cyber threat in the synthetic cyberattack, and 3) effects of any countermeasures used by a human cybersecurity team and any automated responses by an autonomous response module in a cyber security appliance on the cyber threat that was deployed.

10. The apparatus of claim 1, where the synthetic cyberattack tool is configured to interact with one or more data stores which have information about previous emails, information about previous cyber security incidents, information about restoration from cyber security incidents, information about the architecture and policies implemented in the real world network that the end user and/or the cyber security team member interacts with, and information about the end user and their behavior in the real world network under analysis in order to inject realism into the synthetic cyberattack.

11. A method to protect against cyber threats, comprising:
providing a synthetic cyberattack tool to use a generative artificial intelligence component to assist in generating a synthetic cyberattack to produce one or more cybersecurity incidents and/or events, and then to provide an analysis and an explanation for a purpose of providing cyber security training to at least one of
   i) an end user of a network and
   ii) a cyber security team member for the network,
providing the synthetic cyberattack tool to cooperate with at least one of a cyberattack simulator and a cloud based war gaming virtual machine platform to perform synthetic cyberattacks in a mimic network, where the mimic network consists of a network of at least one of
   1) an information technology network,
   2) a cloud network, and
   3) an email network,
   corresponding to a portion of an architecture and policies implemented in a real world network that the end user and/or the cyber security team member interacts with, where the mimic network of an organization is implemented in at least one of
   i) an environment of the cyberattack simulator and
   ii) as virtual machines in a cloud environment of the cloud based war gaming virtual machine platform,
providing the synthetic cyberattack tool to orchestrate the synthetic cyberattack in a wargaming cyberattack exercise in the mimic network utilizing the generative artificial intelligence component, where the synthetic cyberattack tool is configured to derive
   I) the synthetic cyberattack from real world cyberattacks and
   II) the wargaming cyberattack exercise from real world behaviors of the end user and/or the cyber security team member as well as the architecture and policies implemented in the real world network that the end user and/or the cyber security team member interact with, and
providing a user interface component for the synthetic cyberattack tool to display both results of testing in the wargaming cyberattack exercise along with an explainability on an understanding by the machine learning of the synthetic cyberattack.

12. The method of claim 11, further comprising:
providing the synthetic cyberattack tool to cooperate with the cyberattack simulator and/or the cloud based war gaming virtual machine platform to communicate with a series of sensors deployed in the mimic network in i) the environment of the cloud based war gaming virtual machine platform and/or ii) the environment of the cyberattack simulator to collect data produced during the wargaming cyberattack exercise, as well as retrieve historical data on the real world network, the end user and/or the cyber security team member from a data store to utilize the historical data during the wargaming cyberattack exercise.

13. The method of claim 11, further comprising:
providing the synthetic cyberattack tool to cooperate with an email inducement text highlighting tool to create one or more phishing emails based upon historical information about types of emails that the end user and/or the cyber security team member, under analysis, has historically received and any inducement within those types of emails, and then to use the phishing emails as part of the synthetic cyberattack.

14. The method of claim 11, further comprising:
providing the synthetic cyberattack tool to cooperate with an email inducement text highlighting tool, where the email inducement text highlighting tool has a natural language processor and a transformer model trained on different types of malicious inducements for email users, and
providing the natural language processor to take in text and a structure of the fields of an email to understand the text in the email, and feed them to the transformer model to understand an intent of the text in the email, under analysis, and then for the email inducement text highlighting tool to highlight words and phrases which correspond to one or more of the different types of malicious inducements for email users.

15. The method of claim 11, further comprising:

providing the generative artificial intelligence component as an autonomous agent large language model, and providing the synthetic cyberattack tool to use the autonomous agent large language model to orchestrate what type of cyberattack will be generated in the synthetic cyberattack and then to correlate disparate steps taken by the synthetic cyberattack in the cyberattack simulator and/or the cloud based war gaming virtual machine platform based upon previous cyberattack incidents, including information about detections and model breaches, that have happened, as well as take in information about actions taken to mitigate the synthetic cyberattack that are currently in place, and then suggest what step to take to advance the synthetic cyberattack.

16. The method of claim 11, further comprising:

providing the synthetic cyberattack tool to cooperate with the cyberattack simulator to provide attack path modeling data that is incorporated in by the synthetic cyberattack to assist in choosing a particular attack path route through the mimic network based on actual vulnerabilities in the corresponding real world network.

17. The method of claim 11, further comprising:

providing the synthetic cyberattack tool to work with the cyberattack simulator and/or the cloud based war gaming virtual machine platform to allow autonomous generation of the synthetic cyberattack and a coordinated series of operations executed by machine learning components working together without a need of a human stitching those operations together.

18. The method of claim 11, further comprising:

providing the generative artificial intelligence component as an autonomous agent large language model, and providing the synthetic cyberattack tool to use the autonomous agent large language model trained on graphs describing a security compromise produced by a human cyber security analyst in order to then produce a graph for the synthetic cyberattack, and then follow nodes of the graph for steps in the synthetic cyberattack in the mimic network.

19. The method of claim 11, further comprising:

providing the user interface component to output aspects of results of the wargaming cyberattack exercise in a form of a printable report and/or report displayable on a display screen, where results of the wargaming cyberattack exercise in the printable report and/or on the displayable report include 1) a log of attack data of how the synthetic cyberattack is progressing on the mimic network, 2) what components in the mimic network are being affected by a cyber threat in the synthetic cyberattack, and 3) effects of any countermeasures used by a human cybersecurity team and any automated responses by an autonomous response module in a cyber security appliance on the cyber threat that was deployed.

20. A non-transitory storage medium including software that, upon execution by a processor, is configured to perform operations comprising:

using a synthetic cyberattack tool that cooperates with a generative artificial intelligence component to assist in generating a synthetic cyberattack to produce one or more cybersecurity incidents and/or events, and then provides an analysis and an explanation for a purpose of providing cyber security training to at least one of i) an end user of a network and ii) a cyber security team member for the network, using the synthetic cyberattack tool that also cooperates with at least one of a cyberattack simulator and a cloud based war gaming virtual machine platform to perform synthetic cyberattacks in a mimic network, where the mimic network consists of a network of at least one of 1) an information technology network, 2) a cloud network, and 3) an email network, corresponding to a portion of an architecture and policies implemented in a real world network that the end user and/or the cyber security team member interacts with, where the mimic network of an organization is implemented in at least one of i) an environment of the cyberattack simulator and ii) as virtual machines in a cloud environment of the cloud based war gaming virtual machine platform, using the synthetic cyberattack tool to orchestrate the synthetic cyberattack in a wargaming cyberattack exercise in the mimic network utilizing the generative artificial intelligence component, using the synthetic cyberattack tool to derive I) the synthetic cyberattack from real world cyberattacks and II) the wargaming cyberattack exercise from real world behaviors of the end user and/or the cyber security team member as well as the architecture and policies implemented in the real world network that the end user and/or the cyber security team member interact with, and using a user interface component for the synthetic cyberattack tool to display both results of testing in the wargaming cyberattack exercise along with an explainability on an understanding by the machine learning of the synthetic cyberattack.

* * * * *